United States Patent
Musa et al.

(10) Patent No.: US 10,761,673 B2
(45) Date of Patent: Sep. 1, 2020

(54) MANAGING DISPLAY OF DETACHABLE WINDOWS IN A GUI COMPUTING ENVIRONMENT

(71) Applicant: Oracle International Corporation, Redwood Shores, CA (US)

(72) Inventors: Rami Musa, San Francisco, CA (US); Arin Bhowmick, Fremont, CA (US); Melinda Uhland, San Ramon, CA (US); Christopher Patterson, Los Altos Hills, CA (US); Min Wu, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 136 days.

(21) Appl. No.: 13/795,678

(22) Filed: Mar. 12, 2013

(65) Prior Publication Data

US 2014/0282213 A1    Sep. 18, 2014

(51) Int. Cl.
*G06F 3/0481* (2013.01)
*G06F 9/451* (2018.01)

(52) U.S. Cl.
CPC ............ *G06F 3/0481* (2013.01); *G06F 9/451* (2018.02)

(58) Field of Classification Search
CPC ............................... G06F 3/0481; G06F 9/451
See application file for complete search history.

(56) References Cited

U.S. PATENT DOCUMENTS

| | | | | |
|---|---|---|---|---|
| 4,931,783 A * | 6/1990 | Atkinson | ............... | G06F 3/0482 345/163 |
| 5,742,768 A * | 4/1998 | Gennaro | ............ | G06F 17/30873 707/E17.111 |
| 5,801,703 A * | 9/1998 | Bowden | ................ | G06F 3/0482 715/841 |
| 5,802,530 A * | 9/1998 | Van Hoff | .............. | G06F 9/4443 709/203 |
| 5,821,931 A * | 10/1998 | Berquist | ............... | G06F 3/0481 715/784 |
| 5,870,091 A * | 2/1999 | Lazarony, Jr. | ........ | G06F 3/0481 715/804 |

(Continued)

OTHER PUBLICATIONS

PeopleSoft Human Resources Training Manual; Apr. 2011; 116 pages.

*Primary Examiner* — Ryan Barrett
(74) *Attorney, Agent, or Firm* — Trellis IP Law Group, PC

(57) ABSTRACT

A system and method for facilitating user interaction with a software application. An example method includes displaying a first primary window of an application; providing a user option to select a sub-window of the first primary window, resulting in generation of a detached window corresponding to the sub-window in response thereto; leaving a first user interface control in the first primary window in place of the sub-window, wherein the first user interface control provides a first user option to implement a first action pertaining to the detached window; and including a second user interface control in proximity to the detached window, wherein the second user interface control provides a first user option to implement a second action applicable to the detached window and primary window. The user interface controls may be implemented via headers in the primary window and detached window. Data is automatically synchronized between windows.

20 Claims, 13 Drawing Sheets

(56) References Cited

U.S. PATENT DOCUMENTS

| | | | | |
|---|---|---|---|---|
| 5,923,326 A * | 7/1999 | Bittinger | G06F 3/0481 | 715/805 |
| 6,229,539 B1 * | 5/2001 | Morcos | G06F 9/4443 | 715/808 |
| 6,401,134 B1 * | 6/2002 | Razavi | G06F 9/44526 | 715/808 |
| 6,765,592 B1 * | 7/2004 | Pletcher | G06F 9/4443 | 715/760 |
| 7,478,339 B2 * | 1/2009 | Pettiross | G06F 3/0481 | 715/779 |
| 7,921,380 B2 * | 4/2011 | Guido | G06F 17/30873 | 715/835 |
| 8,040,360 B2 * | 10/2011 | Louch | G06F 9/4443 | 345/629 |
| 8,042,110 B1 * | 10/2011 | Kawahara | G06F 9/4443 | 715/764 |
| 8,397,176 B2 * | 3/2013 | Subramanian | G06F 3/0481 | 715/711 |
| 2004/0113948 A1 * | 6/2004 | Shahrbabaki | G06F 3/0483 | 715/777 |
| 2004/0230560 A1 * | 11/2004 | Elza | G06F 40/166 | |
| 2005/0223334 A1 * | 10/2005 | Guido | G06F 3/0481 | 715/794 |
| 2005/0289478 A1 * | 12/2005 | Landman | G06F 3/048 | 715/804 |
| 2006/0224991 A1 * | 10/2006 | Stabb | G06F 9/451 | 715/781 |
| 2007/0094342 A1 * | 4/2007 | Bostick | G06F 3/0481 | 709/207 |
| 2009/0007004 A1 * | 1/2009 | Holecek | G06F 3/048 | 715/779 |
| 2009/0037823 A1 * | 2/2009 | Guido | G06F 17/30873 | 715/733 |
| 2009/0187853 A1 * | 7/2009 | Noyes | G06F 3/0481 | 715/802 |
| 2014/0282213 A1 * | 9/2014 | Musa | G06F 3/0481 | 715/781 |

\* cited by examiner

MANAGING DISPLAY OF DETACHABLE WINDOWS IN A GUI COMPUTING ENVIRONMENT

BACKGROUND

The present application relates to software and more specifically to user interface designs and methods for facilitating efficient user access to data and software functionality.

User interface designs and accompanying methods for facilitating user access to data and software functionality are employed in various demanding applications, including enterprise, scientific research, financial analysis, and ecommerce applications. Such application often demand user friendly applications that facilitate efficient management of application windows and content to enable rapid performance of tasks and user access to requisite data and functionality without requiring undue navigation through software menus, windows, and so on.

Efficient methods for manipulating application windows and facilitating data access are particularly important in enterprise applications, such as Customer Relationship Management (CRM) applications, which often demand features for user management of complex simultaneous tasks involving multiple instances of running applications and/or application windows.

For example, a customer service agent working with a CRM application may simultaneously assist several customers via electronic chat. This may involve a user opening potentially hundreds of application windows, running multiple simultaneous software processes, performing multiple data retrieval steps, and so on. Conventionally, changes to one window may not be updated in a related window (i.e., the windows are not synchronized), and important windows may become buried and lost behind other less important windows. Typically, users must manually switch to windows with relevant content when they switch context (e.g., when a user switches from assisting one customer to assisting another customer). Work may be interrupted when windows become disorganized and when content is lost among open windows.

To address problems with multiple overlapping windows, agents may employ very large monitors or several monitors over which application windows may be dispersed. However, important windows may remain obscured behind other windows, and windows may remain relatively disorganized and camouflaged among other similar looking windows.

Generally, conventional software applications often attempt to incorporate as much data and functionality as possible into a single primary view, e.g., webpage or application window. Application features and functionality are often optimized for a primary task performed in the primary window. Additional windows may be spawned for secondary tasks, but these windows often obscure features and user interface controls of the primary window. This can be problematic even in cases involving only a few open windows.

A primary window may have sub-windows or sections that contain summarized data. However, summarized data may lack requisite detail for a given task. In addition, complex tasks or simultaneous tasks may require access to more data and more granular views of data than can fit within a single view.

Typically only a subset of data, windows, and tools are visible and readily accessible or available at a given time. This may further inhibit rapid performance of secondary tasks, e.g., involving cross-referencing of data, and so on, when requisite windows do not fit within a single view. This may reduce worker productivity and cause user frustration, as a user must stop working on a primary task to navigate to different part of the application or website to perform a secondary task.

In certain cases, to avoid tedious navigation within a single view, users run multiple instances of an application concurrently to access requisite data. However, work interruptions and human error may still occur when windows become disorganized and when content is lost among multiple unsynchronized open windows.

Hence, conventional software applications often lack effective mechanisms for enabling efficient access to data and functionality, and may further suffer from data synchronization problems. These problems become increasingly problematic when more software tasks are addressed approximately in parallel or when working on complex tasks involving multiple windows, data sets, and software processes.

SUMMARY

An example method for facilitating user interaction with a software application includes displaying a first primary window of an application; providing a user option to select a section of the first primary window, resulting in generation of a detached window corresponding to the section in response thereto; leaving a first user interface control in the first primary window in place of the section, wherein the first user interface control provides a first user option to implement a first action pertaining to the detached window; and including a second user interface control in proximity to the detached window, wherein the second user interface control provides a second user option to implement a second action.

In a more specific embodiment, the second user interface control is implemented as part of a header of the detached window. The second action may include creating a new window group and adding the detached window to a window group. Data may be automatically synchronized between windows of the window group. Note, however, that data synchronization is not limited to occurring between windows of a window group.

The first user interface control may be implemented as part of a ghost header remaining in the first primary window in response to detachment of the section as a detached window. The first action may include displaying a group status of the detached window and performing other actions remotely on the detached window. The group status indicates whether or not the detached window is part of a window group and the name of such group.

The example method further includes providing a user option to select and detach plural sections of the first primary window, resulting in plural detached windows in response thereto. A user may assign one or more windows of the plural detached windows to a window group via the second user interface control provided in a header of one or more of the plural detached windows. The second user interface control may include a drop-down menu with a user option to select a window group and a user option to create a window group.

The example method further includes providing a user option to select one or more open windows of the plural detached windows, and then automatically adding selected open windows to a window group identified in the drop-down menu, when the drop-down menu is open.

Alternatively, upon user selection of a window group or user creation of a window group, while the drop-down menu is activated, i.e., open, another user option enables user selection of one or more open windows of the plural detached windows, thereby triggering automatic deployment of a drop-down menu in each selected window in response to selection thereof. The deployed drop-down menu includes one or more user options for specifying a window group to assign to the selected one or more open windows.

The example method may further include providing a user option to add one or more windows that were detached from a second primary window to a window group that includes one or more windows detached from the first primary window. All windows of a window group are moved forward in front of other windows not part of the window group, upon user selection of a window of the window group. However, a selected window of a window group may remain the top window upon user selection thereof.

Another user option may enable a user to trigger sticking of a detached window. User selection of a window of an application associated with a stuck window may cause the stuck window to come forward in front of other windows of the application, i.e., in front of all windows of the application, or in front of all windows other than the selected window, which may remain on top in certain implementations.

One or more additional user options enable grouping of multiple detached windows; synchronizing the multiple detached windows; and selectively sticking multiple detached windows. All stuck windows are selectively brought forward in front of other application windows upon user selection of one or more of the multiple detached windows. In general, multiple windows can be stuck individually, or an entire window group can be stuck by sticking one of its group members.

A third user interface control in a window header may facilitate implementing an action applicable to all windows of a window group associated with the header. A fourth user interface control in a window header is adapted to trigger display of a drop-down menu with user options for creating a new window group; selecting a window group; adding the detached window to the selected window group, and so on.

Hence, certain embodiments discussed herein provide efficient mechanisms for organizing windows and accompanying data and functionality, facilitating access thereto, synchronizing content, and affecting movement of windows in front of or behind other windows. Various embodiments herein may further provide functionality to manage how windows of open instances of application windows interact; to efficiently distribute windows across larger display areas, multiple displays, multiple devices, and so on; to enable efficient user access to current data and functionality relevant to particular tasks being performed.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, a web-based application may be any software application that is accessible via a browser, where computer instructions, e.g., computer code, associated with the software application, may be provided as content from a server.

A user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A user interface control may be any displayed element or component of a user interface display screen, which is adapted to enable a user to provide input, view data, and/or otherwise interact with a user interface. Additional examples of user interface controls include buttons, drop-down menus, menu items, tap-and-hold touch screen functionality, and so on. Similarly, a user interface control signal may be any signal that is provided as input for software, wherein the input affects a user interface display screen and/or accompanying software application associated with the software.

A header, such as a window header or page header, may represent a user interface control if it includes one or more features, e.g., sub-controls, that are adapted to enable a user to initiate a software action.

A software action, also simply called action herein, may be any process or collection of processes implemented via software. Example processes include moving an application window in front of another window, returning or reattaching a detached window to a primary window from which the detached window was detached, adding a window to a group of windows, sticking or pinning a window (as discussed more fully below), synchronizing data or layout settings between windows, updating or editing data in a database, displaying data visualizations or analytics, triggering a sequence of processes, launching an Enterprise Resource Planning (ERP) software application, displaying a dialog box, and so on.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
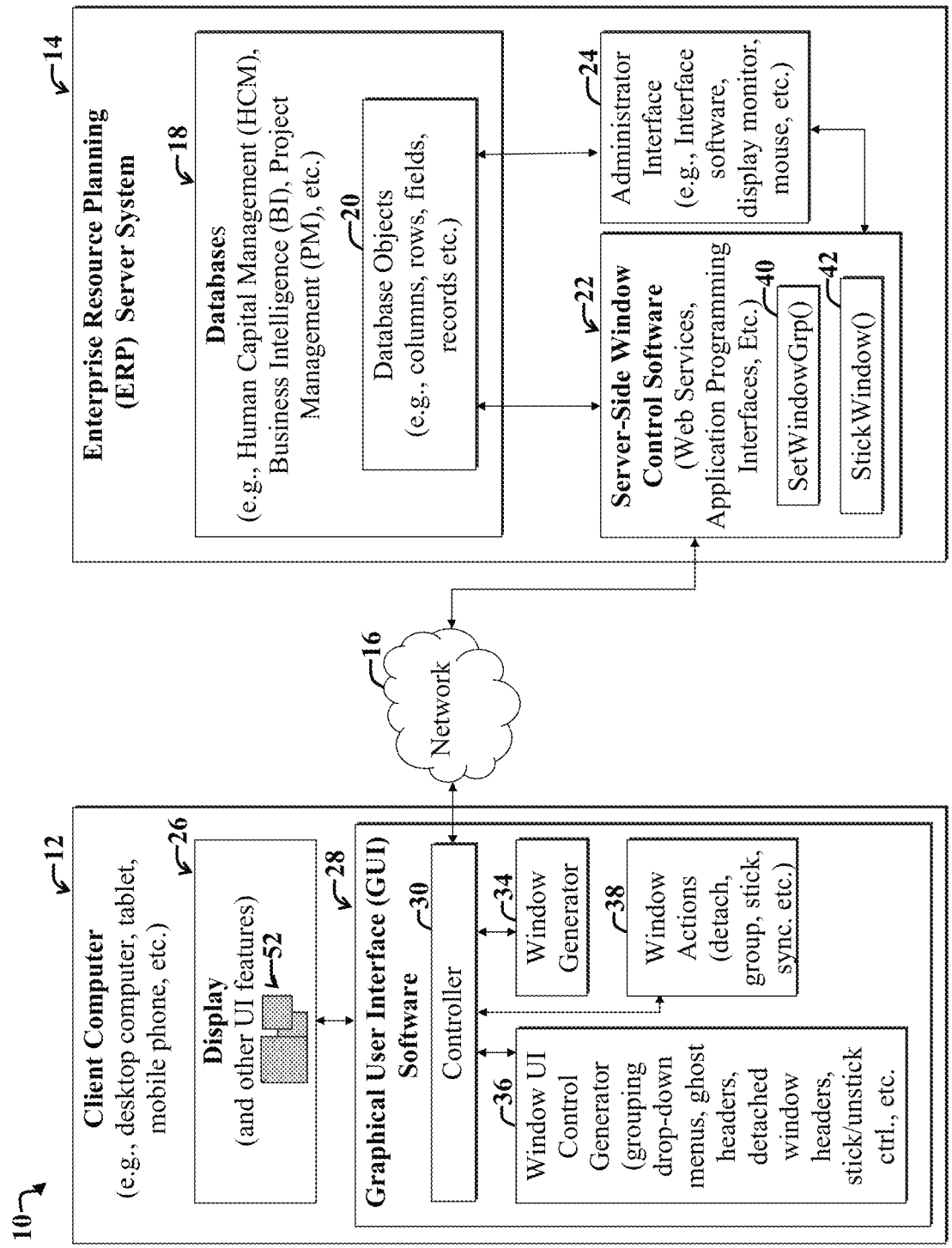
FIG. 1 is a diagram illustrating an example enterprise computing environment and accompanying system for facilitating user management of windows, data, and functionality of one or more enterprise applications.

FIG. 1 is a diagram illustrating an example enterprise computing environment and accompanying system 10 for facilitating user management of windows, data, and functionality of one or more enterprise applications, such as ERP databases 18.

For the purposes of the present discussion, an enterprise may be any organization of persons, such as a business, university, government, military, and so on. The terms "organization" and "enterprise" are employed interchangeably herein. Personnel of an organization may include any persons associated with the organization, such as employees, contractors, board members, and so on.

ERP software may be any set of computer code that is adapted to facilitate managing resources of an organization. Example resources include Human Resources (HR), financial resources, assets, employees, customers, business contacts, potential customers, and so on, of an enterprise. The terms "ERP software" and "ERP application" may be employed interchangeably herein. However, an ERP application may include one or more ERP software modules or components, such as user interface software modules or components. An ERP system may be any infrastructure, i.e., resources, such as hardware and ERP software, used to facilitate managing resources of an organization.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

In FIG. 1, the example system 10 includes a client computer (also called a client device) 12 in communication with an Enterprise Resource Planning (ERP) server system 14 via a network 16, such as the Internet. The ERP system 14 includes various databases 18, which store database objects 20. While the system 10 is shown including various modules running on the client device 12 and the ERP server system 14, those skilled in the art will appreciate that the various modules may be run on a single computer or multiple computers (e.g., more than two computers), without departing from the scope of the present teachings.

In the present example embodiment, the server-side software 22, such as web services, Application Programming Interfaces (APIs), and so on, may communicate with the database objects 20 to selectively employ data thereby, such as to facilitate implementation of various software applications, which may include server-side and client-side software applications. Generally, server-side implementations involve running applications on the ERP server 14 in response to a request from a client, such as the client computer 12. The server-side application may then send data and/or instructions back to the client device 12. In client-side implementations, software may be downloaded to the client computer 12 and executed locally on the device 12.

The example ERP server system 14 includes an administrator user interface 24, which may include hardware and software functionality for enabling an administrator to make changes to various components of the ERP server system 14, such as settings, installed software, and so on.

The client computer 12 represents an example client device that communicates with server-side window control software 22. Note that client devices other than client desktop computers, e.g., mobile phones, tablets, and so on, may be employed without departing from the scope of the present teachings.

The client computer 12 employs a display 26 in communication with Graphical User Interface (GUI) software 28, which is adapted to facilitate displaying one or more managed windows 52 via the display 26. The GUI software 28 may be any software application or component, such as a spread sheet program, graphing software, and so on, that is adapted to facilitate displaying graphical user interface features and/or data, such as windows, menu items, dialog boxes, and so on.

Note that while the display 26 is shown as a single display, that in practice, various embodiments discussed herein are also applicable to multi-monitor applications and applications that may simultaneously employ monitors of plural devices, e.g., tablets, desktop computers, mobile phones, and so on.

The example GUI software 28 includes a controller 30 in communication with a window generator 34, a window actions module 38, and a window User Interface (UI) controls module 36. The controller 30 includes computer code for coordinating inputs and outputs to and from the modules 34-38 and interfacing the GUI software 28 and accompanying modules 34-38 with the server-side window control software 22.

In an example operative scenario, a user employs the client computer 12 to browse to a website hosted by the ERP server system 14, which provides access to the server-side window control software 22 and accompanying database objects 20. The controller 30 may facilitate downloading database objects 20 from the ERP server system 14 and server-side window control software 22 for use in populating data displayed via managed windows 52 illustrated via the display 26.

The windows 52 are called managed windows herein, as certain embodiments discussed herein provide various mechanisms and user interface features for facilitating controlling and managing various window behaviors, including, but not limited to enabling grouping windows, sticking windows, synchronizing data and functionality between windows, affecting how grouped windows behave when selected, and so on, as discussed more fully below.

In the present example operative scenario, the GUI software 28 selectively downloads database objects 20 from the ERP server system 18. The window generator 34 then employs client-side window-generating software to construct one or more managed windows in accordance with instructions included in the controller 30 and input from the display 26 and/or accompanying user input mechanisms (e.g., mouse, touch screen functionality, keyboard, etc.).

Initial or default methods and algorithms for presenting windows of an application, determining any automatic window groupings and data synchronization behaviors, and so on, may be initially determined by the GUI software 28. The controller 30 may facilitate implementing GUI components and user interface controls to provide user options to group windows, stick windows, resize windows, move related windows or groups of windows in front of or behind other windows, and so on, as discussed more fully below.

For the purposes of the present discussion, a user interface control may be any displayed element or component of a user interface display screen, which is adapted to enable a user to provide input, view data, and/or otherwise interact with a user interface. Additional examples of user interface controls include buttons, drop-down menus, menu items, tap-and-hold functionality, and so on. Similarly, a user interface control signal may be any signal that is provided as input for software, wherein the input affects a user interface display screen and/or accompanying software application associated with the software.

Key functionality for adjusting displayed characteristics and behavioral characteristics of managed windows may be included in various functions (e.g., SetWindowGrp( ) 40 and StickWindow( ) 42 functions) of the server-side window control software API 22. The functions 40, 42 may be called remotely via the window generator 34 and controller 30 as needed in response to certain user input, or automatically in accordance with instructions included in the controller 30. Alternatively, the functions 40, 42 may be downloaded to the client computer 12 and run client-side. Functions in addition to or other than those shown, for implementing various embodiments discussed herein, may be included in the server-side window control software 22, without departing from the scope of the present teachings.

The SetWindowGrp( ) function 40 of the server-side window control software 22 may include computer code for facilitating grouping windows displayed via the display 26 and for controlling behavior of grouped windows. When a user employs a user interface control of a window header to add a window to a group, the GUI software 28 may call the SetWindowGrp( ) function 40 to execute code for synchronizing data between displayed grouped windows and for ensuring that when a window of a group is selected, that all windows of the window group are brought forward in front of other windows of the application.

In an example embodiment, if several windows are part of a group, and first window of a group is partially behind a second window of the group, the ordering is said to represent an ordering state. The ordering state may be preserved when grouped windows are brought forward in front of other windows in response to user selection of a window of the group, with the exception that the selected window of the window group is brought forward in front of other windows of the group, if the selected window is not already in front of other windows of the group, as indicated by the ordering state of the window group. However, in certain implementations, stuck windows may be brought forward in front of the selected window. One or more user interface controls may be provided to enable a user to configure behavior of stuck windows, e.g., to control whether or not stuck windows come forward in front of a selected window that is not stuck.

The StickWindow( ) function 42 of the server-side window control software 22 may include computer code for facilitating sticking windows and controlling behaviors of stuck windows. In the present example embodiment, when a window of an application is stuck, selection of any window of the application will cause the stuck window to come forward in front of other unstuck windows of the application and any other running application windows, along with the selected window. The StickWindow( ) function 42 is said to implement a window sticking function, which is responsive to user input via the client computer 12 and accompanying user interface controls included in window or page headers, as discussed more fully below.

Those skilled in the art with access to the present teachings may readily implement the SetWindowGrp( ) function 40, the StickWindow( ) function 42, and the various modules 28-38 of the client computer 12, without undue experimentation.

Note that while the example GUI software 28 is shown included in the client computer 12, implementations are not limited thereto. For example, the GUI software 28 may be incorporated into the server-side window control software 22 and run on the server 14 as a server-side application. The server side application may be run server-side and viewed client-side via browser software running on the client computer 12.

In the present example embodiment, various GUI modules 34-38 include computer code for implementing functionality for adjusting how managed windows are displayed via the display 26. Example window UI controls, which may be implemented in part via the window UI controls module 36, include drop-down menus and window sticking controls (e.g., buttons or icons) in window and/or page headers, such as ghost headers and/or headers of detached windows or accompanying pages, for facilitating grouping windows, sticking windows, detaching windows from a primary window, sending a detached window back to a primary window, and so on, as discussed more fully below.

Example window actions 38 include detaching, sticking, and grouping windows in response to user selection of one or more UI controls generated by the window UI control generator 36.

Figure 2:
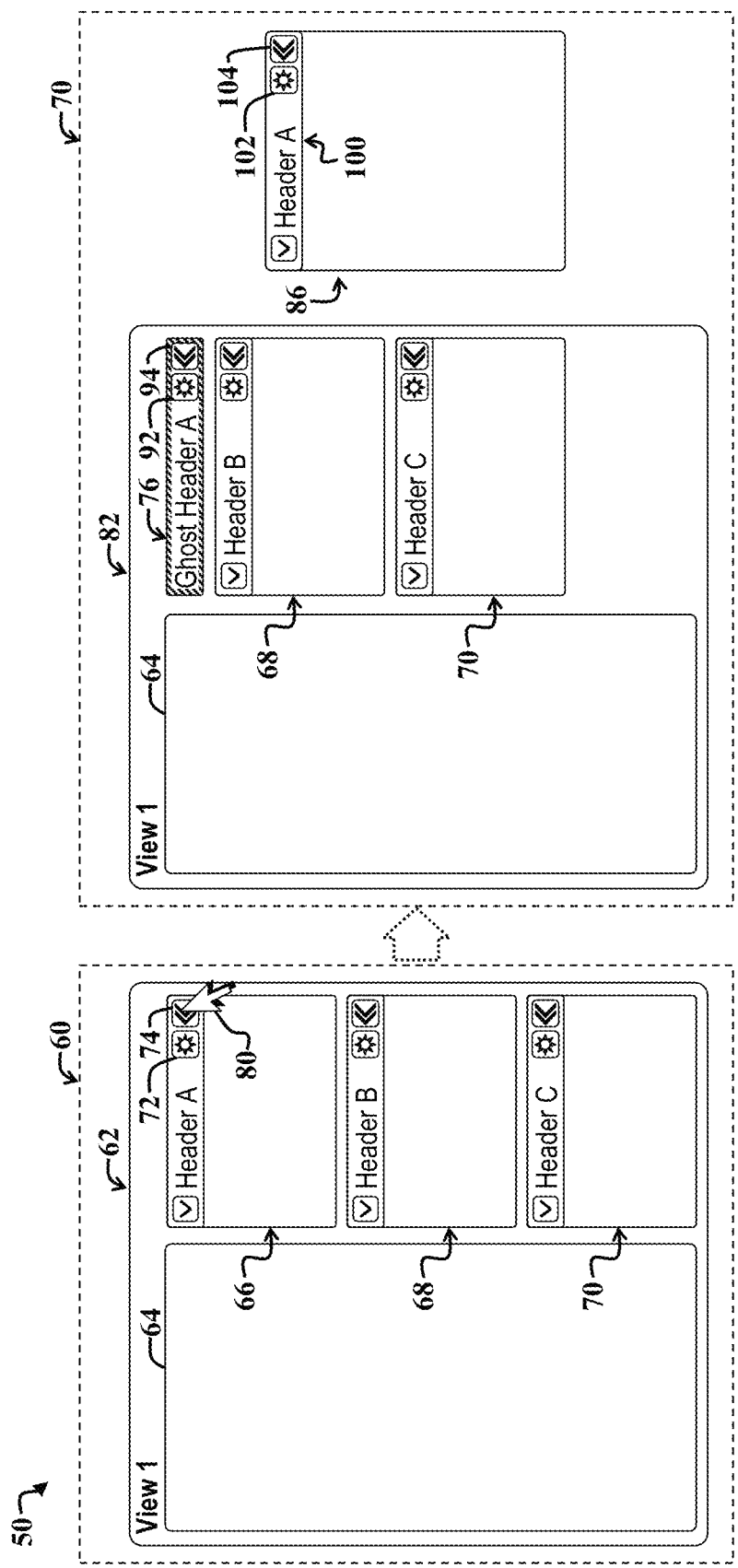
FIG. 2 shows a first example set of user interface display screens illustrating detachment of a section of a primary window, resulting in a detached window in response thereto.

FIG. 2 shows a first example set of user interface display screens 50, including a first screen 60 and a second screen 70, illustrating detachment of a section 66, i.e., sub-window, of a first primary window 62, resulting in a detached window 86 in response thereto. The first example screen 60 includes the first primary window 62, which includes various sections 64-70, including a first sub-window 66, a second sub-window 68, and a third sub-window 70. The sub-windows 66-70, also simply called windows herein, are vertically arranged on a right portion of the first primary window 62 to the right of and adjacent to a larger window section 64.

For the purposes of the present discussion, a primary window may be any window that includes one or more sections, e.g., sub-windows, which can be detached from the primary window to result in one or more additional windows, called detached windows, that are different than the primary window. A detached window may be any window that is separate from a first window, but which was created in response to user selection of a user interface control or other feature of the first window. A primary window is also called a parent window herein.

The sub-windows 66-70 include user interface controls 72, 74 in sub-window headers (Headers A-C). The user interface controls 72, 74 are adapted to facilitate enabling a user to detach the sub-windows 66-70 from the first primary window 62 and to enable reattachment of a window when detached, such as the detached window 86.

In the present example embodiment, the first user interface control 72 is called a menu button, since user selection thereof may result in display of a drop-down menu that includes additional user interface controls for initiating software actions pertaining to the sub-window or any corresponding detached windows, as discussed more fully below. The second user interface control 74 may act as a detach button or an attachment button (e.g., when the accompanying window is detached), such that user selection of the button 74 results in detachment of the sub-window from the first primary window 62.

The second screen 70 represents the first screen 60 after detachment of the sub-window 66 from the first primary window 62. In addition to the detached window 86, the second screen 70 includes an updated version 82 of the first primary window 62 showing that the first sub-window 66 has been detached from the first primary window 62, leaving the ghost header 76 in its place in the updated primary window 82.

In an example operative scenario, a user employs a mouse cursor 80 (simply called a mouse herein) to select a detach button 74 of a header (Header A) of the first sub-window 66. Upon user selection of the detach button 74, the first screen 60 transitions to the second screen 70. The second screen 70 shows that the first sub-window 66 has become detached from the first primary window 62 in response to user selection of the detach button 74.

The ghost header 76 left in place of the first window 66 (corresponding to the detached window 86) includes user interface controls 92, 94, including a menu button 92, and an attachment button 94, corresponding to the original menu button 74 and attachment button 94, respectively. The user interface controls 92, 94 may be used to affect the detached window 86, which has been separated from the first primary window 62 corresponding to the updated primary window 82 of the second screen 70. For example, user selection of the attachment button 94 may result in reattachment of the detached window 86 to the updated parent window 82, resulting in transition of the screen 70 back to the screen 60.

For the purposes of the present discussion, a ghost header, such as the ghost header 76, may be any window header that lacks an accompanying window that was previously coupled to or associated with the header. A header may be any section of a user interface display screen providing window identification information (e.g., "Header A") or one or more user interface controls or widgets (e.g., controls 92, 94) pertaining to a window (e.g., the detached window 86). Ghost headers are generally detached from, i.e., not positioned adjacent to the window identified by the identification information in the ghost header.

Hence, ghost header mechanisms and functionality discussed herein can also (i.e., in addition to conventional window headers) be applied to tabs, menus and accompanying menu items, and other user interface controls, without departing from the scope of the present teachings.

While certain embodiments discussed here illustrate detachment of a section of a primary window and leaving behind a corresponding ghost header in the parent window or view to provide easy access to the detached window's status and to provide controls to manipulate the detached window from the ghost header and from the detached window itself, embodiments are not limited thereto. For example, in certain implementations, detached windows, also called secondary windows, may be detached or launched from a menu in response to user selection of one or menu items adapted to generate detached windows in response to user selection thereof. In this case, the menu may provide access to the status of the detached window and provide access to controls to manipulate it. Accordingly, the menu and accompanying user options provided thereby may play the role of a ghost header or ghost region. In general, the ghost header concept may be extended and used with various types of User Interface (UI) widgets, without departing from the scope of the present teachings.

The detached window 86 includes user interface controls 102, 104, including a detached window menu button 102 and reattachment button 104 in a detached window header 100. The detached window menu button 102 and reattachment button 104 correspond to the menu button 92 and attachment button 94, respectively of the ghost header 76 remaining in the updated parent window 82.

The detached window menu button 102 may enable display of a drop-down menu for controlling (and implementing applicable actions pertaining to) the detached window and the updated parent window 82. For example, user selection of the detached window reattachment button 104 may result in reattachment of the detached window 86 to the updated parent window 82, thereby transitioning the second screen 70 back to the first screen 60.

Hence, both the ghost header 76 and the associated detached window 86 have user interface controls that may enable control of the detached window 86, such that the detached window 86 can be controlled from two locations.

Note that exact details pertaining to software actions applicable to the detached window 86 and the updated primary window 82 may be application specific and may vary depending upon the needs of a given implementation, without departing from the scope of the present teachings. Furthermore, while buttons (e.g., 92, 94, 102, 104) in headers (e.g., the ghost header 76 and Header A of the detached window 86) are employed to facilitate implementing software actions, that other types of user interface controls and other locations of the user interface controls may be employed, without departing from the scope of the present teachings. For example, in certain implementations, keyboard shortcut keys are employed to affect software actions pertaining to the updated parent window 82, ghost header 76, and corresponding detached window 86.

As another example, while the buttons 102, 104 of the detached window 86 are shown included in the window header 100, that the buttons 102, 104 may be positioned in another location, such as in a page header of a page displayed in a body of the detached window 86. Note that the detached window 86 and any other windows that are subsequently detached from the parent window 82 may be resized, repositioned, overlapped by other windows, and so on.

Furthermore, while the user interface display screens 60, 70 illustrate detachment of one sub-window 66 from the first primary window 62, several sub-windows and/or different sub-windows or other sections may be detached from the first primary window 62. Furthermore, while various sub-windows 66-70 may be detached from the first parent window 62 via user interface controls appearing in sub-window headers, embodiments are not limited thereto. For example, in certain implementations, a user may employ a mouse to drag a bounding box around a portion of the first primary window 62 to affect selection of a section of the primary window 62. A subsequent right-click menu option for detaching the section within the bounding box may facilitate detachment of a section of the first primary window pertaining to the region or section contained within the bounding box.

In summary, in the present example embodiment, when a user detaches a region or section of a parent window, resulting in a detached window, a ghost header persists in the parent window, keeping a reference to the original place of the detached content of the detached window. This also allows users to easily apply actions to detached windows from the detached windows or from the corresponding ghost headers.

Figure 3:
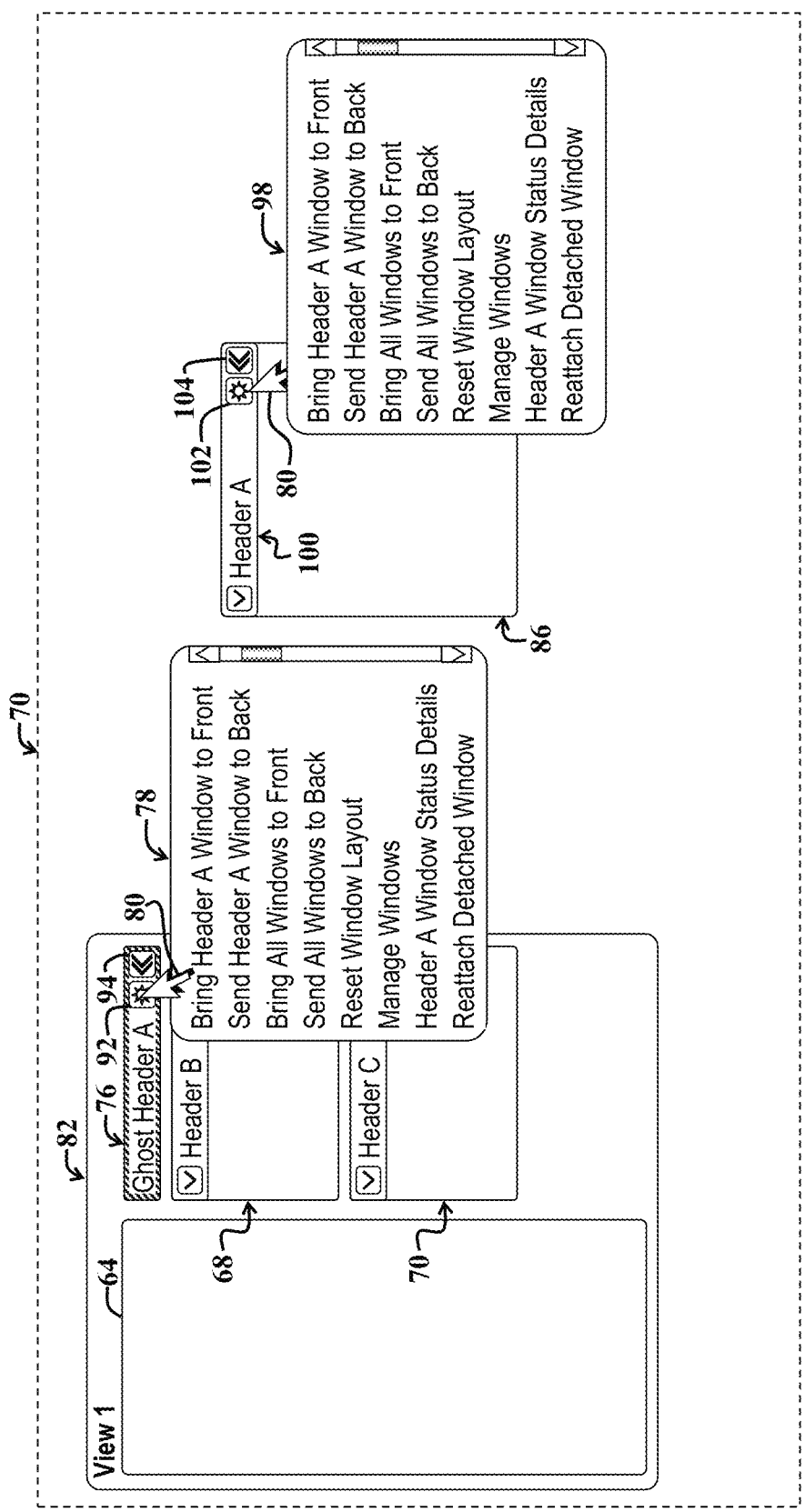
FIG. 3 shows one of the example user interface display screens of FIG. 2 after a user has activated example drop-down menus via a ghost header of a primary window and via a header of a corresponding detached window.

FIG. 3 shows one of the example user interface display screens 70 of FIG. 2 after a user has activated example drop-down menus 78, 98 via the menu button 92 of the ghost header 76 of the primary window 82 and via the corresponding menu button 102 the header 100 of the associated detached window 86.

The first menu 78 and the second menu 98 are substantially similar and include various user options for initiating software actions affecting the primary window 82 and/or detached window 86. For example, the menus 78, 98 include user options for bringing a detached window forward in front of other windows and for sending a detached window behind other windows. Other windows may include any windows that are part of the same software application that generates the windows 82, 86 and may further include any windows of other concurrently running applications.

A third menu item of the drop-down menus 78, 98 represents a user option to bring all windows of the software application forward in front of other windows. A fourth menu item represents a user option to send all windows of the software application behind any other displayed windows that overlap windows of the software application responsible for generating the windows 82, 86. A fifth menu item represents a user option to reset the window layout of the software application. For example, selection of the reset window layout option may cause the detached window 86 to return to the parent primary window 82, resulting in the user interface display screen 70 appearing similar to the user interface display screen 60 of FIG. 2.

A sixth menu item of the drop-down menus 78 represents a user option to manage windows. User selection of the manage windows option may result in generation of an additional window or dialog box with user interface controls for adjusting additional parameters and behaviors of windows.

The additional window may represent a one stop user interface for managing all windows of an application. For example, the additional window may include user options for displaying a list of all attached and detached windows. A user may then scroll or navigate the list as needed to pick windows for reattachment or detachment, for sticking, for grouping, for bringing forward, for saving window layouts, for creating new window layouts, and so on. Such features may enable users to manage all windows at once.

Exact details of a resulting manage window dialog box are implementation specific and may vary, depending upon the needs of a given implementation. In general, various user options provided via the drop-down menus 78, 98 are illustrative and implementation specific, such that they may vary depending upon the needs of a given implementation, without departing from the scope of the present teachings.

One or more additional user interface controls (e.g., buttons, menu items, etc.) may be accessible via a ghost header or header of a detached window for facilitating viewing, displaying, or otherwise enabling user access to status information (e.g., whether a window is detached, part of a group, stuck, etc.) pertaining to a window, e.g., a detached window; for enabling a user to reattach a detached window to a parent window, and so on. Additional user interface controls and accompanying functionality may enable various other actions (than those discussed above) to be performed remotely on a detached window from the ghost header in a parent window, without departing from the scope of the present teachings. For example, additional controls for facilitating configuring window data synchronization behaviors, configuring behaviors of stuck windows, configuring behaviors of grouped windows, and so on, may be provided.

In certain implementations, when a detached window is part of a group, the associated menus 78, 98 may include additional user options for triggering various actions that may apply to an individual detached window and/or to the detached window and other windows of the group to which the detached window belongs. For example, an additional menu item "Bring Group to Front" may be provided. Such additional user options may enable users to fully control and affect detached windows and accompanying behaviors, including those of individual windows, groups of windows, or all windows simultaneously (e.g., as exemplified by the "Bring All Windows to Front" user option).

In general, user productivity may be substantially enhanced by employing embodiments discussed herein to enable users to perform manipulations (e.g., bring detached windows forward/backward, sticking/unsticking, grouping/ungrouping, etc.) on a detached window from a ghost header and from the detached window itself.

Figure 4:
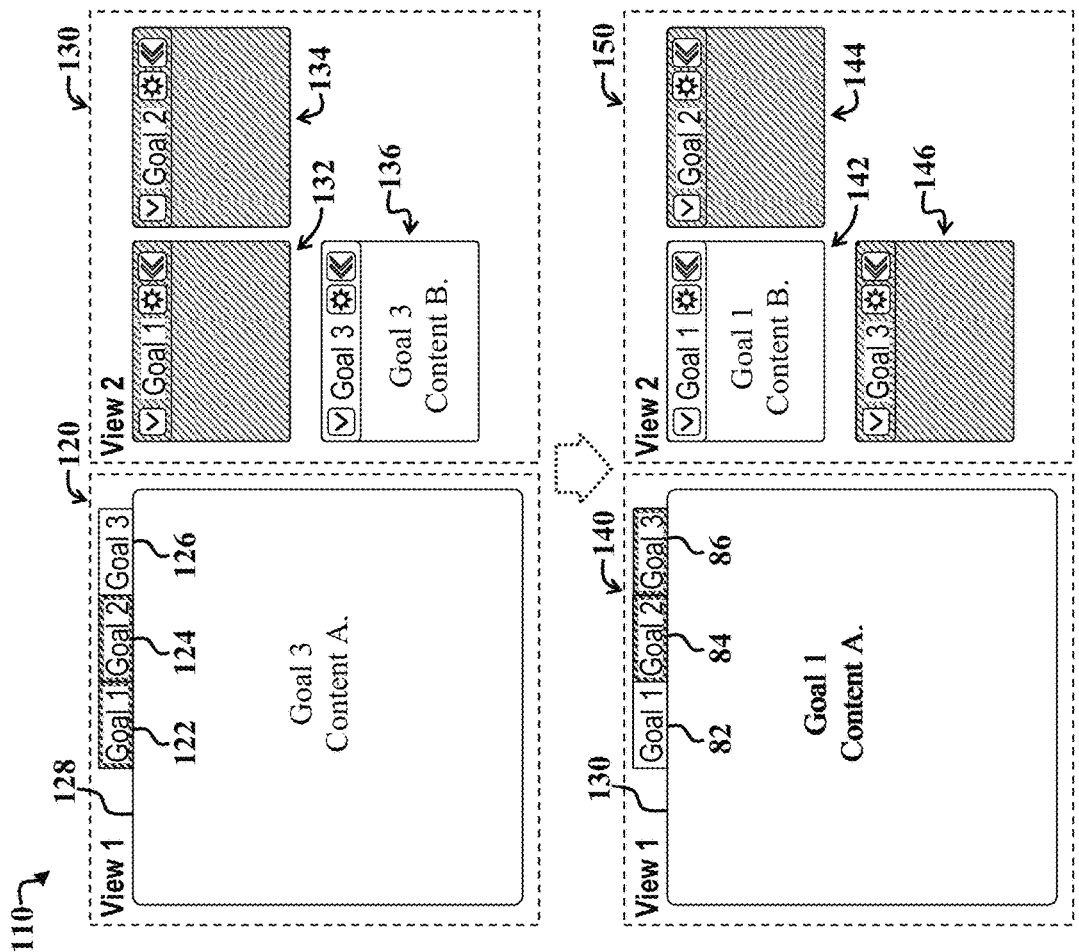
FIG. 4 shows a second example set of user interface display screens illustrating window context maintenance and further illustrating selection of detached windows in response to selection of corresponding headers remaining in a primary window after a detached window is created from a section of the primary window.

FIG. 4 shows a second example set of user interface display screens 110 illustrating window context maintenance (also called context synchronization) and further illustrating selective enabling/disabling of windows 136, 142 or features thereof in response to selection of corresponding headers 126, 82 in a primary window 120, 140.

In FIG. 4, a first view 120 includes various tab headers 122-126 and accompanying tab bodies, where a third tab with a "Goal 3" header 126 is selected. Content (e.g., Goal 3 Content A) may be included in a tab body 128 associated with the third header 126. In the present example embodiment, user selection of the third header 126 brings a third window 136 into focus, and causes greying-out of (or partial disabling of features, e.g., data entry features of) a first window 132 and a second window 134, which correspond to a first tab header 122 and a second tab header of the first view 120, respectively.

In an example operative scenario, various goals (e.g., Goal 1-Goal 3) represent customers being assisted. For example, Goal 3 may pertain to a third customer that is being assisted via a corresponding separate third chat window 136 for Goal 3. Example content included in the tab body 128 associated with the third header 126 may include details pertaining to the third customer currently being assisted. Example content (e.g., Goal 3 content B) included in the third window 136 may include content of an electronic chat conversation occurring between a user and the third customer.

When a user switches from assisting the third customer to assisting a first customer (e.g., corresponding to Goal 1), the user may select the first goal header tab 122, resulting in the selected header 82 and corresponding tab body 130 (e.g., corresponding to a Goal 1 header 82) being brought into focus. This results in bringing into focus a Goal 1 window 142 and greying-out of (or disabling data entry functionality of) windows 144, 146 pertaining to other customers who are not currently being assisted. Hence, when a user switches context in a first primary view 120, 140, context is automatically maintained by adjusting focus of other related windows (e.g., shown second views 130, 150) accordingly. Context is said to be maintained, since changing context in any view or window, automatically switches the context in all the other views or windows accordingly.

In certain embodiments, the various headers 122-126, 82-86 are considered ghost headers, and the corresponding windows 132-136, 142-146 have been detached from portions of the tab bodies (e.g., tab bodies 128, 130). In implementations where the various headers 122-126, 82-86 are ghost headers, and the windows 132-136, 142-146 represent detached windows, both context maintenance and data synchronization may occur between data in a tab body and data maintained in associated detached windows.

In this case, the first set of user interface display screens 120, 130 may further illustrate that upon user selection of a third ghost header 126, a corresponding third window 136 is brought into focus, i.e., selected. Hence, the selected third ghost header 126 is shown highlighted relative to the unselected first ghost header 122 and the second ghost header 124. Similarly, the third window 136 is shown highlighted relative to the unselected first detached window 132 and second detached window 134. In the present example embodiment, the detached windows 132-136, 142-146 may include data and functionality applicable to the associated goals being addressed.

Similarly, in a second set of user interface display screens 140, 150, a user has selected a first ghost header 82, leaving a second ghost header 84 and third ghost header 86 unselected. Accordingly, the first detached window 142 (corresponding to the first ghost header 82) is shown selected, whereas the second detached window 144 and the third detached window 146 are shown unselected.

Similarly, user selection of one or more of the detached windows 132-136, 142-146 may result in corresponding selection of one or more of the ghost headers 122-126, 82-86. Note that, in the present example embodiment, the ghost headers 122-126, 82-86 may also act as tabs, such that content of a primary window body 128, 130 changes dependent upon the selected tab.

The content, e.g., data, tables, graphs, and/or other user interface features of the primary window body 128 may be automatically synchronized with the corresponding detached windows 132-136, 142-146. Alternatively, synchronization is not automatic per se, but is triggered in response to user selection of one of the tabs 122-126, 82-86.

Figure 5:
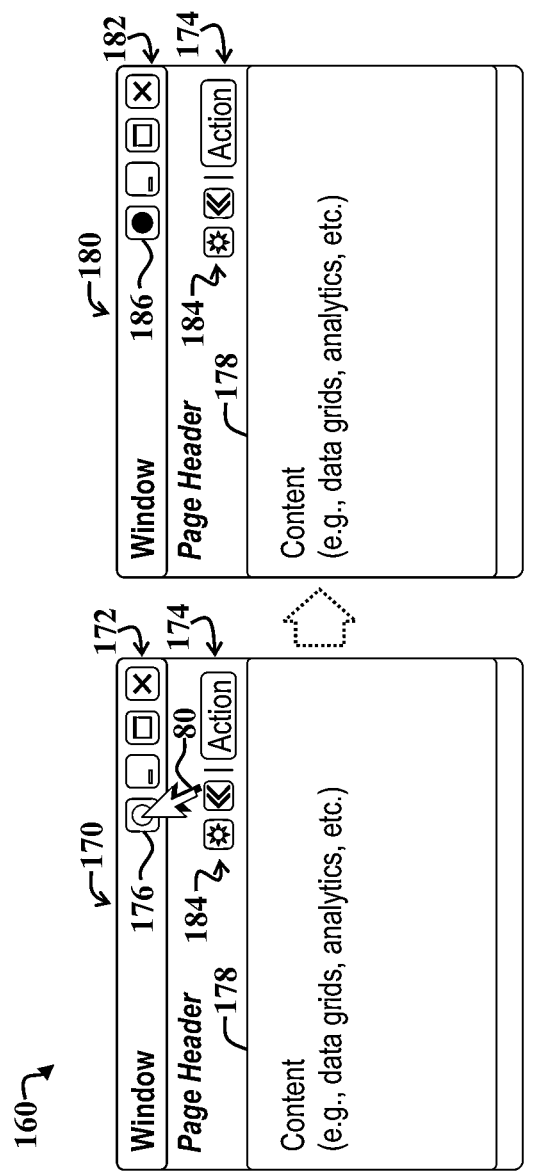
FIG. 5 shows a third example set of user interface display screens illustrating user interface controls in headers of detached windows for sticking and unsticking detached windows.

FIG. 5 shows a third example set of user interface display screens 160 illustrating user interface controls 176, 186 in headers of detached windows 170, 180 for sticking and unsticking detached windows 170, 180. A second window 180 represents an updated version of a first window 170 after user selection of a sticking control 176, also called a stick icon, in a window header 172.

After user selection of the sticking control 176 in the first window 170, the first window is updated by darkening the control, resulting in an updated control 186, as reflected in an updated header 182 of the updated window 180. The updated control 186 indicates that the updated window 180 is stuck.

For the purposes of the present discussion, a window is said to be stuck, if the window behavior is such that selection of any window of the application associated with the window results in bring forward the stuck window in front of any other windows of the application.

In FIG. 5, menu buttons, attachment/detachment buttons, and other user interface controls 184 are included in window page headers 174. The page headers 174 are positioned above window bodies 178, which may include window content, such as data and functionality.

For the purposes of the present discussion, functionality may include any function or set of functions, actions, operations, mechanisms for performing a task via software and may further include any user interface controls, or features and any hardware or software module, device component, and so on, that performs or otherwise enables one or more functions, capabilities, or tasks.

In summary, a user may employ a mouse 80 to click the stick icon 176 to keep the associated window in focus whenever the associated software application is in focus. This may help users keep the window 180 accessible, thereby preventing the window 186 from getting buried behind the windows of other applications that might be open on a desktop. Other windows that a user wishes to have open and readily accessible, but that are accessed less frequently, can be left unstuck. When a user wishes to access an unstuck window, the unstuck window may be easily accessed from a ghost header or tab of a primary window or otherwise directly selected to bring the window into focus, i.e., to select the window.

Figure 6:
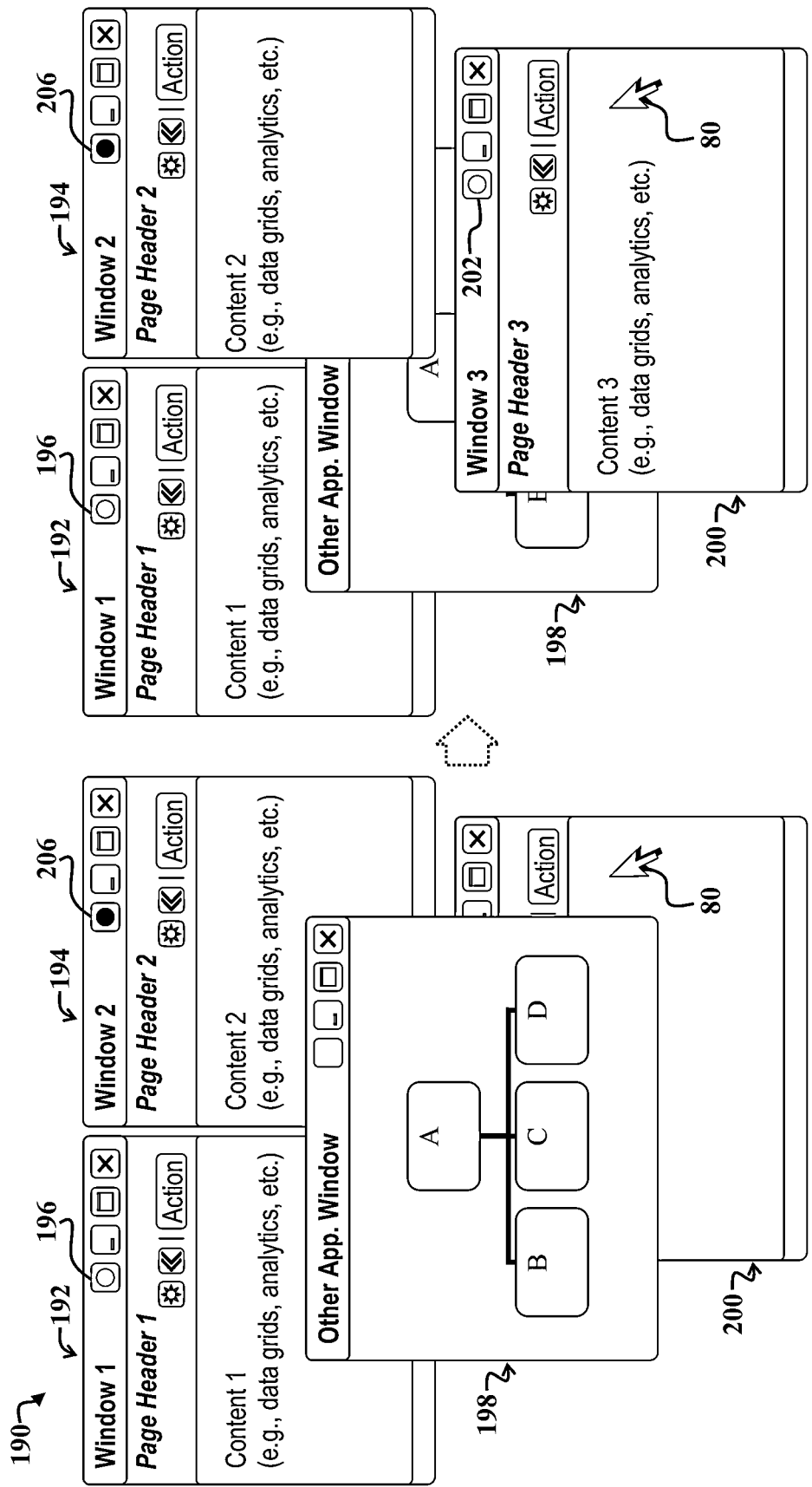
FIG. 6 shows a fourth example set of user interface display screens illustrating example behavior of a stuck detached window upon user selection of another window of the same application.

FIG. 6 shows a fourth example set of user interface display screens 190 illustrating example behavior of a stuck detached window 194 upon selection of another window 200 of the same application. The user interface display screens 190 include a first window 192, a second window 194, and a third window 200 of the same software application. Another window 198 of a different application is initially shown overlapping the three windows 192, 194, 200. Upon user selection of the third window 200, e.g., via a mouse 80, both the selected window 200 and the second window 194 move in front of the other application window 198.

A first stick icon 196 of the first window 192 illustrates that the first window 192 is unstuck. A second stick icon 206 of the second window 194 indicates that the second window 194 is stuck. A third stick icon 202 of the third window 200 indicates that the third window 200 is unstuck.

Since the second window 194 is stuck, user selection of any of the windows 192, 194, 200 of the same application will cause the second window 194 to move in front of all other windows (other than the selected window), including the other application window 198. The other application window 198 may be a window that is generated from an application different from the application that generated the first window 192, the second window 194, and the third window 200.

Accordingly, user selection of the third window 200 causes both the third window 200 and the second stuck window 194 to move in front of all other windows, other than the selected window 200 itself. Note that the first window 192 remains behind other application windows upon user selection of the third window 200, since the first window 192 is unstuck.

In summary, in the present illustrative embodiment, a user employs the mouse 80 to select the third window 200, thereby bringing the window 200 forward along with the stuck window 194. The stuck window may automatically come into focus.

In general, a stuck window that comes forward in front of other windows may remain behind the selected window that triggered bringing the stuck window forward. However, in certain implementations, stuck windows may come forward in front of the selected window, e.g., if the selected window is not also stuck. In cases where stuck windows overlap, the overlapping order of stuck windows may be preserved when stuck windows are brought forward in front of other unstuck windows.

Figure 7:
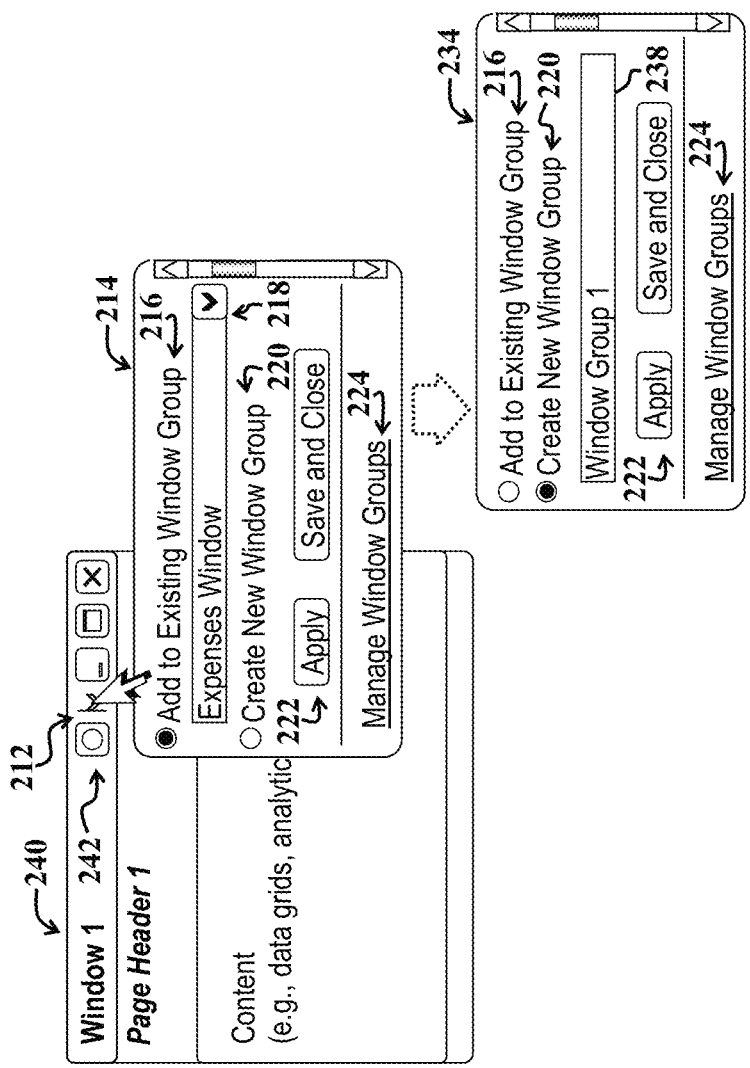
FIG. 7 illustrates a header and accompanying user interface controls of a detached window for adding an ungrouped window to a window group.

FIG. 7 illustrates a header and accompanying user interface controls 242 of a detached window 240 for adding an ungrouped window to a window group. The user interface controls 242 include a grouping control 212, also called a grouping button. User selection of the grouping button 212 results in display of a first drop-down menu 214, which includes various additional controls 216-224 for facilitating creating and/or specifying a window group to enable adding the window 240 thereto. The first drop-down menu 214 transitions to the second drop-down menu 234 depending upon which controls of the first drop-down menu 214 are selected.

The first drop-down menu 214 includes a group-selection radio button control 216 and accompanying drop-down selection control 218. The drop-down selection control 218 appears in response to user selection of the group-selection radio button control 216. The drop-down selection control 218 provides a drop-down list of user selectable previously created window groups from which a user may choose to assign the window 240 to.

The first drop-down menu 214 further includes a group-creation radio button control 220 and controls 222 for applying and/or saving user inputs provided to the first drop-down menu 214 and for closing the drop-down menu 214. Another control 224 represents a user option to manage window groups. User selection of the manage window groups control 224 may result in display of another window or dialog box wherein a user may make additional adjustments to existing window groups; wherein a user may create additional window groups, and so on.

Note that window group memberships may also be managed from a central location, e.g., from a window or dialog box that is displayed in response to user selection of a "Manage Windows" option from a drop-down menu, such as that included in the drop-down menus 78, 98 of FIG. 3. Note that a user option for triggering a user interface display screen for managing window group memberships may be provided via another mechanism, e.g., a button or other user interface control, other than a menu item included in a drop-down list.

The manage window groups control 224 may represent a user interface control and accompanying option an action applicable to all windows of a window group associated with the header. Example actions include sticking all windows of a window group; triggering data synchronization between all windows of a windows group; saving group layouts for use on other computing platforms and/or displays, and so on.

Note that data synchronization is not limited to data synchronization between windows of a window group. However, in certain specific implementations, data synchronization may be limited to occurring between windows of a particular window group. In other implementations, all windows of an application (or set of running applications), including the primary window and detached windows, may be synchronized. In other implementations, one or more user interface controls may enable users to turn on or off synchronization behaviors between open application windows.

In the first drop-down menu 214, a user has chosen to add the window 240 to an expenses window group specified via the drop-down selection control 218. If the user then applies this selection, e.g., by selecting an apply button of the additional controls 222, then the header of the window 240 will be updated to indicate that the window 240 is part of the expenses window group.

However, for illustrative purposes, in the present example embodiment, instead of applying the expenses window selection, the user instead selects the create new window group radio button control 220, which transitions the first drop-down menu 214 to the second drop-down menu 234. The second drop-down menu 234 is similar to the first drop-down menu 214, with the exception that the group-selection radio button 216 is unselected; the drop-down selection control 218 is removed; the group-creation radio button control 220 is selected; and a window group creation field 238 is shown.

The window group creation field 238 provides a mechanism enabling a user to specify a name for a window group to be created. In the present case, the user has entered "Window Group 1." After applying the input and closing the drop-down menu 234, a new window group called Window Group 1 is created, and the window 240 is added to the group Window Group 1.

For the purposes of the present discussion, a window group may be any collection of one or more windows identified by a common name, called the group name. In certain embodiments discussed herein, certain behaviors may be applied to windows of a group.

For example, selection of one window of a group may cause all windows of the group to move forward in front of other application windows that are not part of the window group. Furthermore, data displayed in each window of a group may be synchronized, such that when data is changed in one window of the group, corresponding adjustments are made to data displayed in other windows of the same group. This is called data synchronization between windows of a window group. The windows of a window group are said to be linked via window linking.

Software and accompanying methods for implementing window linking is known in the art and may readily be adapted for use in embodiments discussed wherein without undue experimentation.

Figure 8:
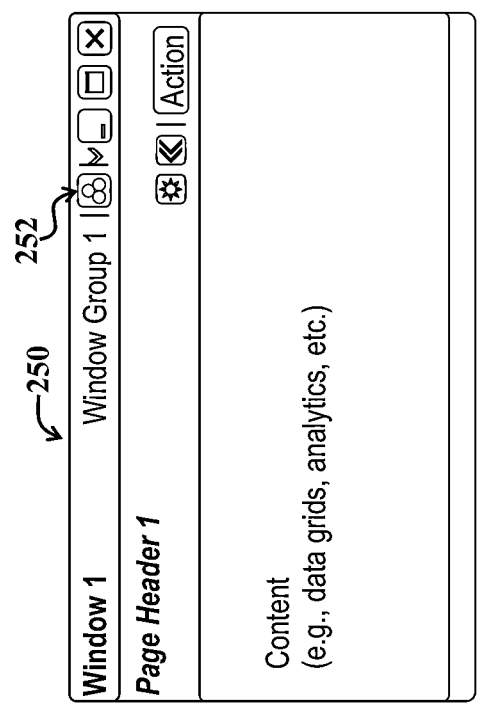
FIG. 8 illustrates the detached window of FIG. 7 after the detached window has been added to a group, but before the resulting grouped window has been stuck.

FIG. 8 illustrates the detached window 240 of FIG. 7 after the detached window 240 has been added to a group, but before the resulting grouped window 250 shown in FIG. 8 has been stuck.

Figure 11:
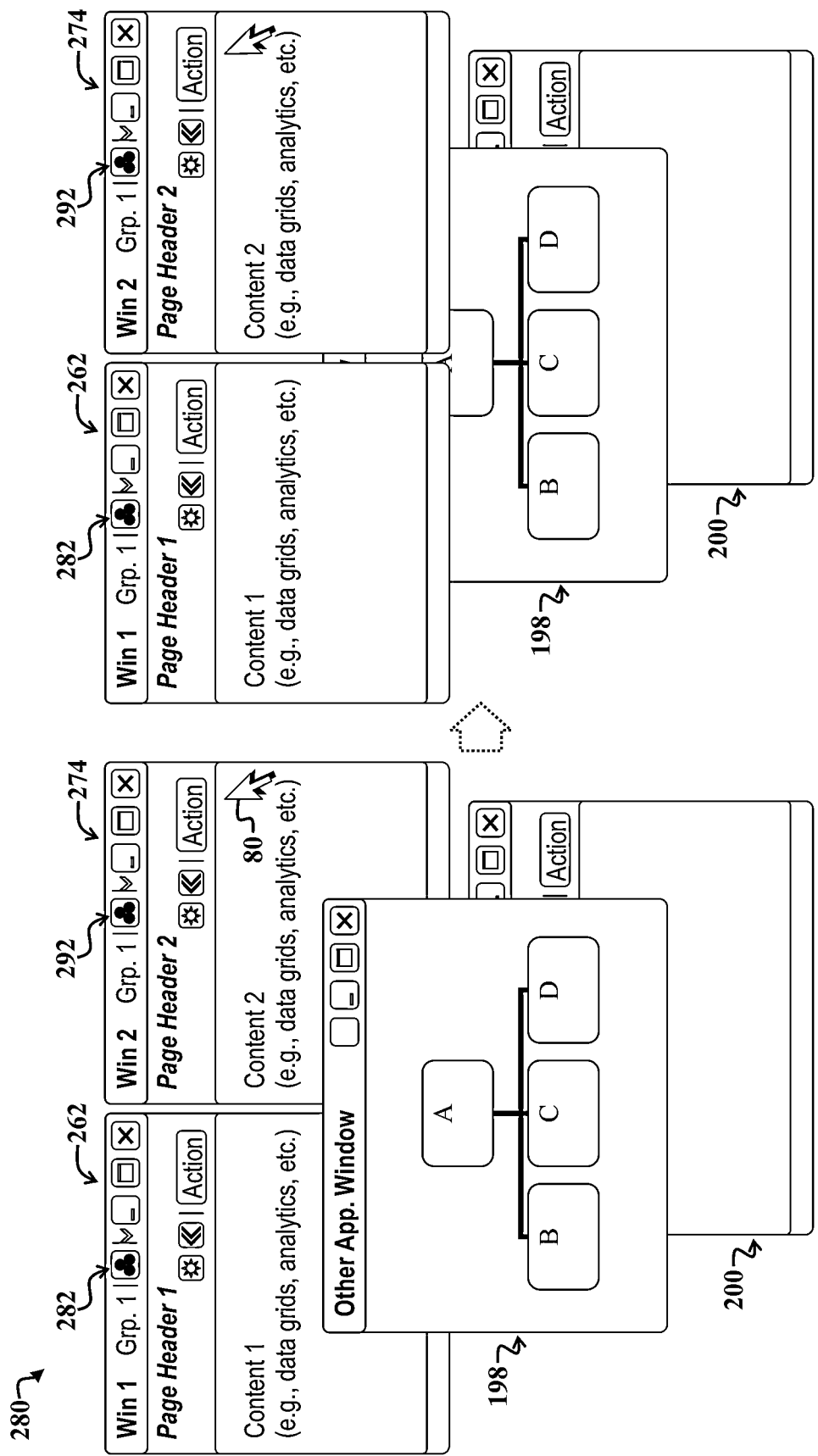
FIG. 11 shows a seventh example set of user interface display screens illustrating example behavior of grouped and stuck windows upon user selection of a stuck and grouped window of the same application.

In the updated window 250, a stick icon has been replaced with a group stick icon 252, and the window header has been updated to indicate that the window 250 is now part of Window Group 1. Appearance of the group stick icon 252 also indicates that the window 250 is part of a window group, and further indicates that the window is unstuck, by virtue of the color or opacity of the group stick icon 252. When the grouped window 250 is stuck, the group stick icon 252 will darken, e.g., as shown in FIG. 11 below.

Figure 9:
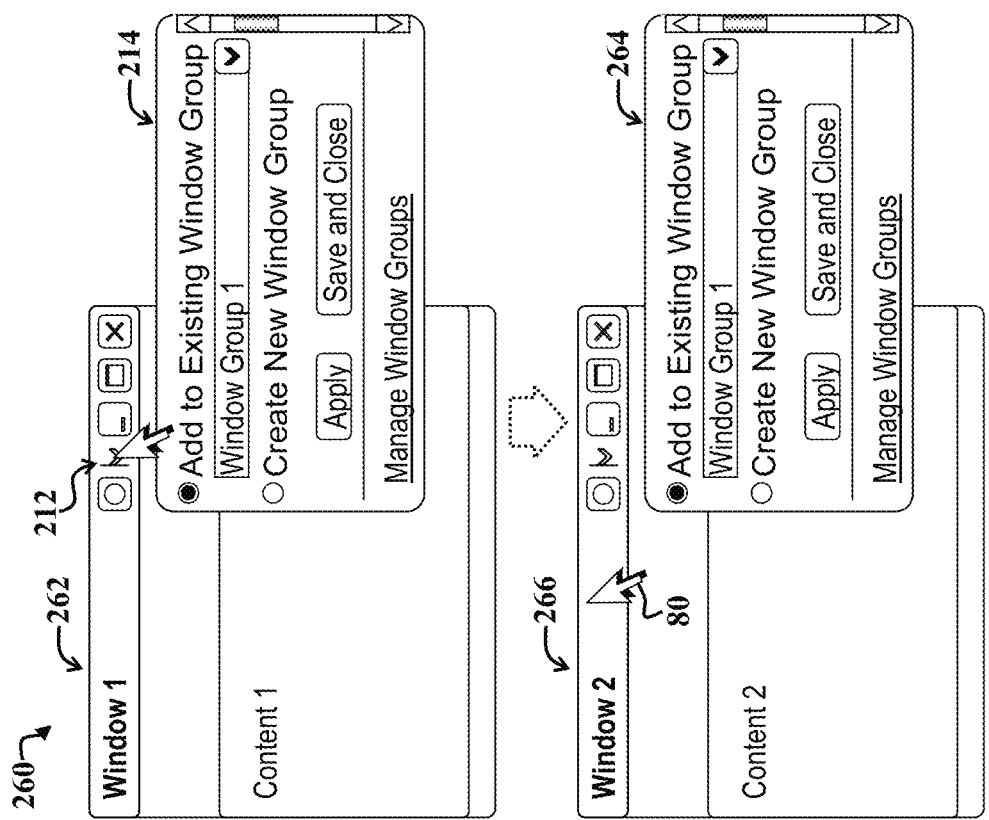
FIG. 9 shows a fifth example set of user interface display screens illustrating operation of a mechanism for facilitating adding detached windows to a group when a group drop-down menu is open.

FIG. 9 shows a fifth example set of user interface display screens 260 illustrating operation of a mechanism for facilitating adding detached windows 266 to a group when a group drop-down menu 214 is open.

In the present example embodiment, a user has employed the header grouping control 212 in a first window 262 to display the group drop-down menu 214. When the group-drop menu 214 is open and displayed, user selection (e.g., via the mouse 80) of other open windows, e.g., a second detached window 266 results in automatic display of an associated group drop-down menu 264. The associated group drop-down menu 264 will appear with similar user selections as the first group drop-down menu 214. This facilitates quickly adding open windows to a newly selected or newly created window group.

In summary, to facilitate adding several windows to a group, once the user expands a drop-down menu that defines the groups, the user can click other windows, and the modal state is applied to the selected windows and the associated drop-down menu (e.g., menu 264) is shown. The window group information is pre-filled. The user may simply click an apply button, and the two windows (e.g., windows 262 and 266) then become part of the same group (e.g., Window Group 1).

Alternatively, when the first group drop-down menu 214 is activated and open, user selection of other windows triggers automatic addition of the selected windows to the window group specified in the first drop-down menu 214.

Once a user clicks Apply, the status of the group stick icon 212 changes to indicate that the window(s) 262, 266 is/are grouped and unstuck. When stuck, the group stick icon, as discussed more fully below, will change to reflect that the window is both grouped and stuck.

Note that while in the present example embodiment, only one additional window 266 is shown being added to a group along with the first window 262, that several additional windows may be added to the group specified by the first drop-down menu 214.

A generalized method for facilitating adding windows to a window group may be summarized as follows: upon user selection of a window group or user creation of a window group, while the group drop-down menu is activated, providing a user option to select one or more open windows of the plural detached windows, automatically deploying a drop-down menu in each selected window in response thereto, wherein the deployed drop-down menu includes one or more user options for specifying a window group to assign to the selected one or more open windows.

Note that the first window 262 and the second window 266 may represent detached windows, which have been detached from similar or different primary windows, i.e., parent windows. Accordingly, in certain embodiments, different window groups may include windows from different parent or primary windows. Furthermore, note that detached windows, which may represent sub-windows or sub-sections of parent or primary windows, may themselves include sections or sub-windows, which may be separated, resulting in additional detached windows.

Figure 10:
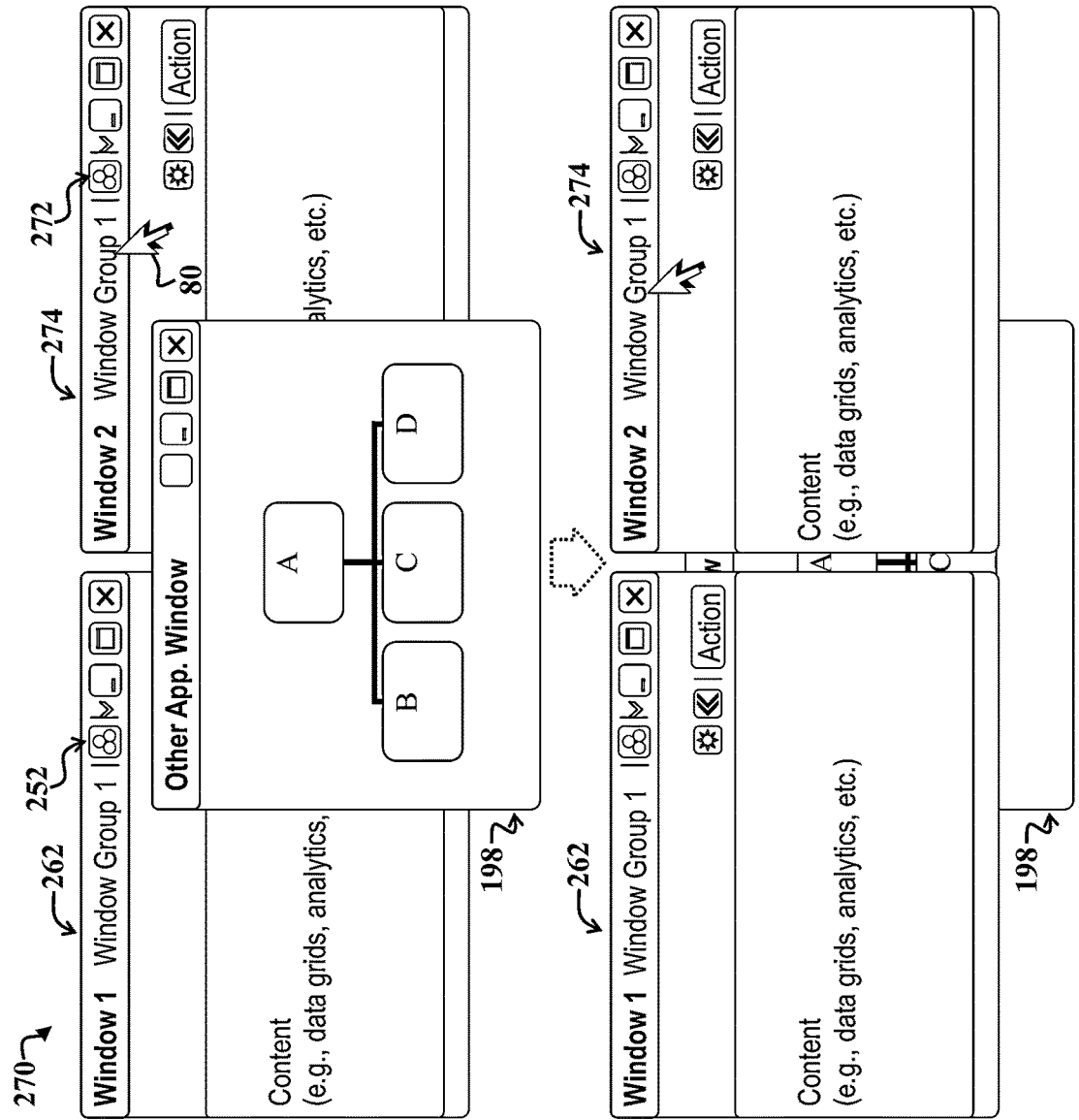
FIG. 10 shows a sixth example set of user interface display screens illustrating example behavior of grouped, but unstuck windows.

FIG. 10 shows a sixth example set of user interface display screens 270, illustrating example behavior of grouped, but unstuck detached windows 262, 274. The detached windows 262, 274 are grouped but unstuck, as indicated by the group stick icons 252, 272.

The detached windows 262, 274 are initially behind (also called in back of) an application window 198 from a different application than that which generated the first window 262 and the second window 274. Note however, that the other application window 198 may be generated by the same underlying software application that generated the first and second windows 262, 274, without departing from the scope of the present teachings.

In the present example embodiment, a user employs the mouse cursor 80 to select the second window 274 or the first window 262, which results in the windows 262, 274 being moved forward in front of the other window 198. Accordingly, the other window 198 is moved behind, i.e., in back of first window 262 and the second window 274.

In summary, windows belonging to the same window group (e.g., Window Group 1) come forward into focus together. Note that while only one other window 198 is shown, that several windows that are part of the same application or different applications may be moved behind windows of a group corresponding to a selected window.

If the first window 262 were originally positioned behind the second window 274, then user selection of the second window 274 would result in moving the other window 198 behind both the first window 262 and the second window 274, but the relative position order of (e.g., ordering state of) the second window 274 relative to the first window 262 may be preserved. Accordingly, the first window 262 would remain behind the second window 274. If, however, the first window 262 were selected, then the first window 262 would move forward, such that is positioned on top of (also called in front of) the second window 274, which would be positioned on top of, i.e., in front of, the other application window 198.

In the present example embodiment, the first window 262 and the second window 274 are automatically synchronized, such that changes in data or functionality of one window may be automatically propagated to other windows, which are then adjusted accordingly. For the purposes of the present discussion, windows are said to be synchronized if changes to one window are propagated to other windows. The changes could be changes to data, displayed layouts, and so on.

FIG. 11 shows a seventh example set of user interface display screens 280, illustrating example behavior of grouped and stuck windows 262, 274 upon user selection of a stuck and grouped window 274 of the same application.

In the present example embodiment, the first window 262 and the second window 274 are grouped and stuck, as indicated by darkened group stick icons 282, 292. Three windows 262, 274, 200 of the same application are initially positioned behind another application window 198. A user then employs the mouse cursor 80 to select one of the stuck and grouped windows 262, 274. This results in movement of the stuck windows 262, 274 in front of all other windows 198, 200, whether or not the other windows 198, 200 are part of the same application or window group as the first window 262 and second window 274.

For the purposes of the present discussion, when a set of windows are grouped, the set of windows always come forward together when any windows of the set of windows is selected, e.g., clicked, by the user. In the present specific embodiment, if one window of a window group is stuck, this results in the sticking of all windows of the associated window group, such that the window group is said to be stuck.

When a group of windows of an application is stuck, then user selection of a another window, e.g., a window that may or may not be part of the group, causes all windows of the group to move forward in front of other windows that are not stuck, but may remain behind the application window that was selected. The overlapped order of any overlapping grouped windows may be remain preserved. For example, if a first grouped and stuck window is initially behind a second grouped and stuck window of the same group, then selection of another window of the application may bring the first and second grouped and stuck windows forward in front of other windows of the application (other than the selected window), while keeping the first window behind the second window.

If windows of a window group overlap, then when the grouped windows are brought forward, the overlap order among windows of the window group may be substantially preserved. However, the selected window of the window group that was selected to bring other windows of a window group forward may remain the topmost window. However, embodiments are not limited thereto. For example, an ordering of grouped windows may be altered in accordance with another scheme when grouped windows are brought forward. For example, a selected window is not required to remain on top in certain implementations.

In summary, windows of window groups can be stuck and unstuck as a group. They can come forward when either is clicked because they are a group. When the windows in a group are unstuck, then selecting one will bring all of the grouped windows forward. When they are stuck, then selecting any window in the application will bring the entire group forward even if the clicked window is not a member of the group but belongs to the same application. The selected window may remain on top. Hence, in general, multiple windows can be stuck individually, or an entire window group can be stuck by sticking one of its group members.

Figure 12:
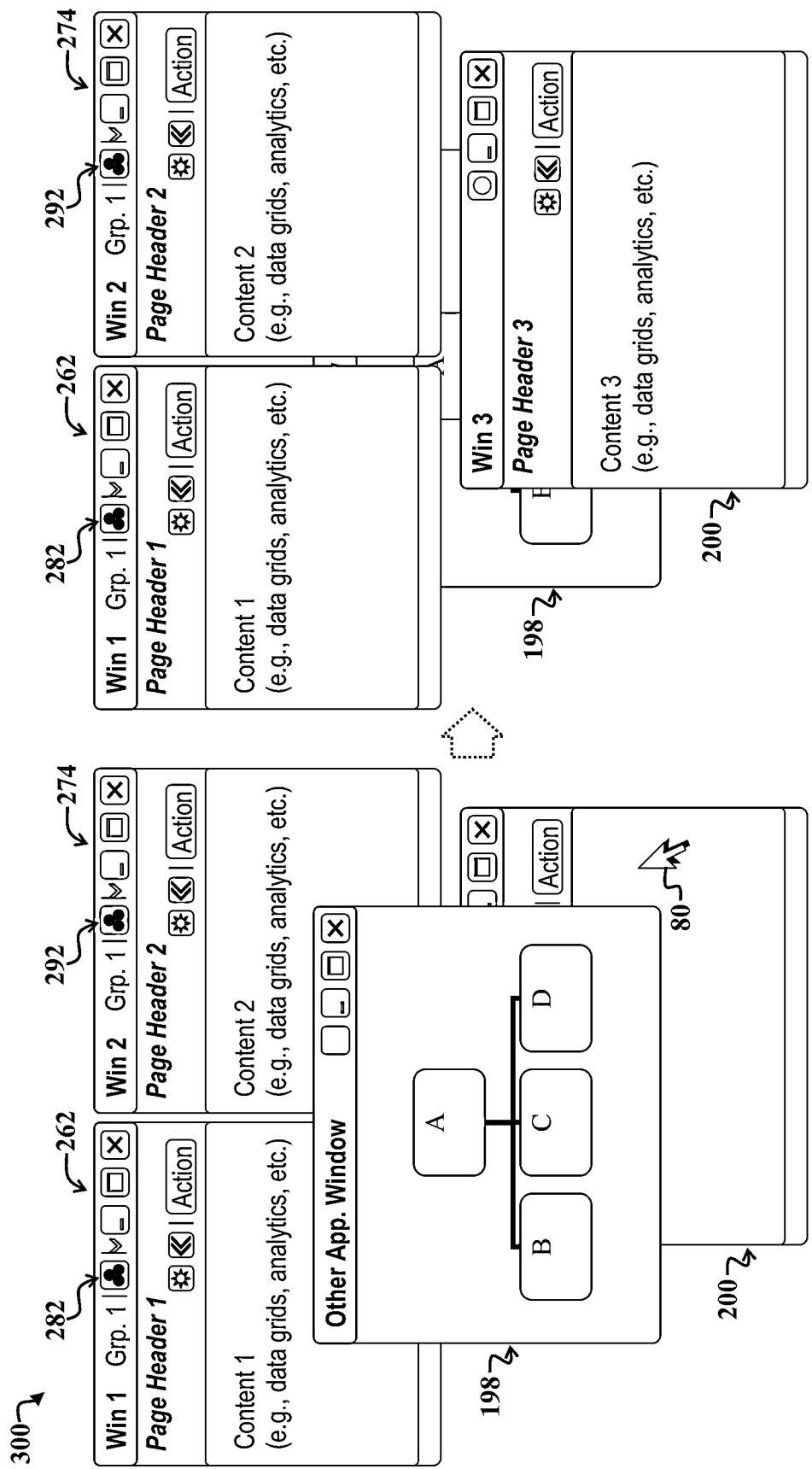
FIG. 12 shows the seventh example set of user interface display screens illustrating example behavior of grouped and stuck windows upon user selection of an unstuck and ungrouped window of the same application.

FIG. 12 shows the seventh example set of user interface display screens 300 illustrating example behavior of grouped and stuck windows 262, 274 upon user selection of an unstuck and ungrouped window 200 of the same application.

In the present example embodiment, a user employs the mouse 80 to select the third window 200, which is unstuck and ungrouped. Since the first window 262 and second window 274 are grouped and stuck, as indicated by accompanying group stick icons 282, 292, both the first window 262 and the second window 274 move in front of the other application window 198 in response to user selection of any other window (e.g., the third window 200) of the same application that generated the first window 262 and the second window 274. Furthermore, the selected third window 200 moves in front of all other displayed windows.

If the third window 200 had initially been behind the first window 262 and/or the second window 274, then user selection of the third window 200 would still cause the third window 200 to move in front of other windows, including the first window 262 and the second window 274. However, the first window 262 and the second window 274 would still move in front of other application windows, e.g., the window 198 and any other windows of the same or different application that are not stuck.

In summary, stuck groups of windows come forward together when any of the stuck windows is selected and also when any other part of the application is brought into focus, i.e., selected.

Note that when any windows of a group are stuck, then windows of the group behave differently than if none of the windows were stuck. For example, if the windows 262, 274 were not stuck, then user selection of the third window 200 may result in the third window 200 moving in front of the other application window 198, while the first window 262 and the second window 274 remain behind the other application window 198.

Note that while in the present example embodiment, all windows of a window group are automatically stuck when one window of a window group is stuck, embodiments are not limited thereto. For example, in certain implementations, individual windows of a window group may be stuck, while other windows of the same window group remain unstuck. In such cases, unstuck windows of a window group may be left behind other windows of the underlying application or other application upon user selection of another application window 198, whereas stuck windows of the window group will be brought forward in front of the other application window 198.

Figure 13:
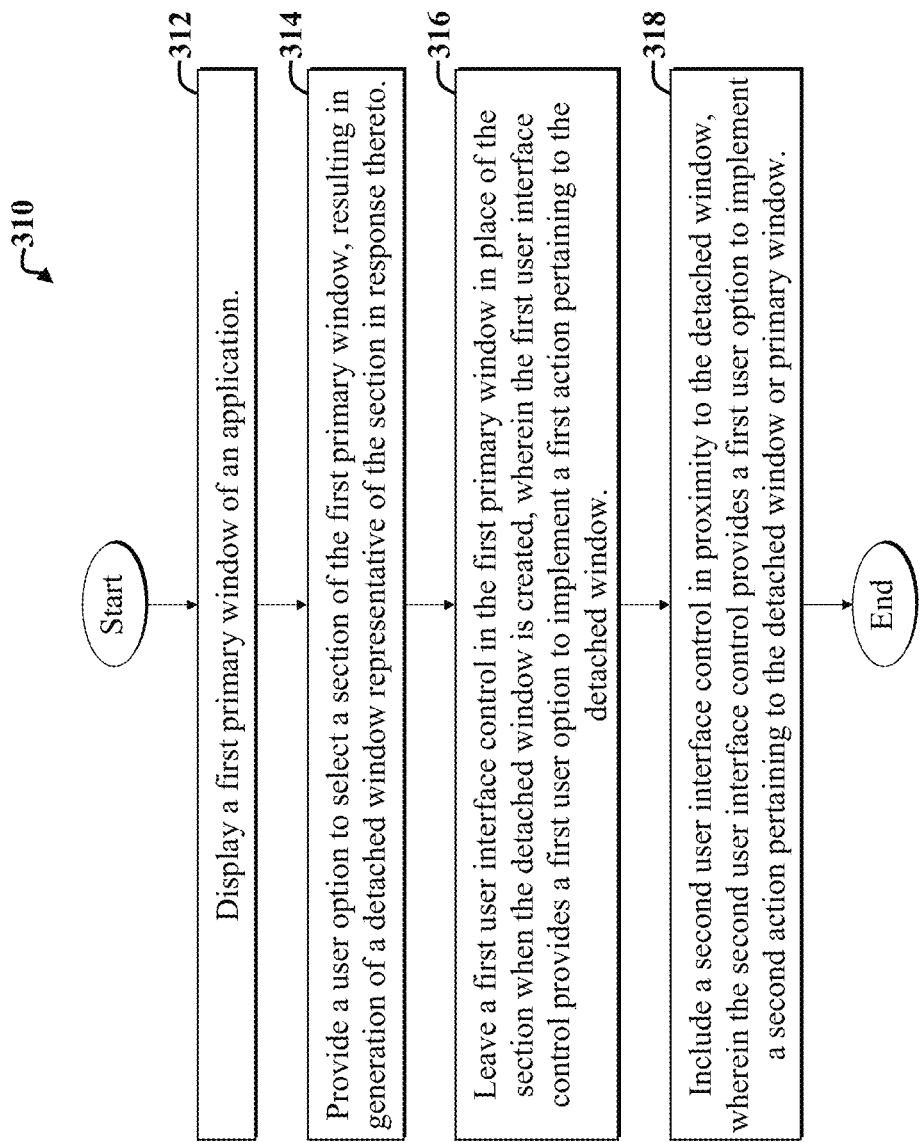
FIG. 13 is a flow diagram of an example method adapted for use with the embodiments of FIGS. 1-12.

FIG. 13 is a flow diagram of an example method 310 adapted for use with the embodiments of FIGS. 1-12. The example method 310 facilitates user interaction with a software application and includes a first step 312, which involves displaying a first primary window of an application.

A second step 314 includes providing a user option to select a section of the first primary window, resulting in generation of a detached window representative of the section in response thereto.

A third step 316 includes leaving a first user interface control (such as an attachment/detachment control, a drop-down menu button, etc., in a ghost header) in the first primary window in place of the section in response to generation of the detached window, wherein the first user interface control provides a first user option to implement a first action pertaining to the detached window. The first action may include, for example, returning a detached window to the first primary window, sticking a detached window, and so on.

A fourth step 318 includes providing a second user interface control in proximity to the detached window, such as in a window header and/or page header of the detached window. The second user interface control provides a first user option to implement a second action. The second action may include, for example, bringing a detached window forward in front of other windows, resetting a window layout, i.e., window arrangement, sticking, and grouping configuration, and so on.

Note that the method 310 may be augmented with additional steps; steps may be rearranged, and certain steps may be omitted, without departing from the scope of the present teachings. For example, the method 310 may further include a step that includes providing one or more user options for enabling a user to create and store window layouts, which may include information pertaining to detached windows, stuck windows, grouped windows, data associated with each window, and so on. Layouts may be remembered across sessions; may be restored and applied to a given application session; may be transferred to and reused on different computing devices, and so on. A user option for storing multiple window layouts can be provided, so that if a user accesses an application from a different computing device, e.g., a home personal computer versus a mobile or work-based computing device, the user may activate one or more pre-stored window layout configurations.

While various embodiments discussed herein refer to a particular embodiment involving controlling windows, e.g., detached windows, parent windows, and so on, of a given software application via use of headers and ghost headers (and/or associated widgets or user interface controls), embodiments are not limited thereto.

For example, embodiments discussed herein may be adapted to facilitate control of multiple open windows of multiple different running applications. Such software for controlling multiple windows (e.g., by providing for sticking, grouping, and remote controlling abilities via a ghost header, detached window header, central user interface window management window, and so on) may be incorporated into a computer operating system; may be run as a client-side application running on top of an operating system but communicating with other open applications; or via other software architectures, such as server-side or distributed computing architectures.

Embodiments that extend window control and data synchronization functionality across different types of software applications may facilitate providing various additional capabilities. For example, in certain implementations, client-side window-control software may be configured to cause automatic grouping of windows from different applications based on content existing in each open window. For example, if a user downloads a Portable Document File (PDF) containing given content; then cuts and pastes some or all of the content into a database file; and then cuts and pastes some or all of the content into a MicroSoft (MS) Word document, while keeping the PDF document, MS Word Document, and database window open, then the open windows may be automatically grouped.

The window control software may track content being transferred to and from a clipboard to different open windows of different applications to facilitate determining which windows to automatically group. Note however, that embodiments are not limited thereto. For example, mechanisms for attaching metadata to content to facilitate tracking content between open windows to determine window groupings may be employed. Alternatively, or in addition, a combination of screen capturing, content reading, and content comparing functionality may be employed to track content occurring in different application windows to adjust window behaviors accordingly.

Furthermore, the window control software may include instructions for generating user interface controls for enabling users to control window management behaviors (e.g., by enabling or disabling automatic window groupings), such as by configuring criteria for determining what types of content should trigger automatic window groupings, similarity thresholds between types of content, and so on.

Although the description has been described with respect to particular embodiments thereof, these particular embodiments are merely illustrative, and not restrictive. For example, while various embodiments discussed herein involve client devices in communication with a server, wherein software for affecting behavior of accompanying windows is included in server-side and/or client-side software, embodiments are not limited thereto. For example, various window behaviors and methods discussed herein may be built into a computer operating system, and such behaviors may extend to windows between different applications running under the operating system, without departing from the scope of the present teachings.

Furthermore, while certain embodiments discussed herein primarily refer to implementations involving one or more displays coupled to a single computer of device, embodiments are not limited thereto. For example, plural monitors used on different devices may be employed to implement embodiments discussed herein, so that windows may be dispersed across multiple monitors and devices, without departing from the scope of the present teachings.

Furthermore, configuration files may be employed to facilitate transferring or synchronizing window layouts and accompanying settings between devices. As devices become increasingly aware of the presence of other devices in their vicinity, applications will increasingly be able to function across devices. For that purpose, window management and grouping systems and methods discussed herein may greatly facilitate software user productivity, as users increasingly work across multiple portable and non-portable devices. For example, a sales agent returning to an office after a customer site meeting may return to the office; then use the office computer with a similar windows configuration as used for a mobile computing device that the agent brought to the customer site meeting. Accordingly, any work that the user began at the customer site on tablet or other mobile computing device may be further addressed on a desktop computer when the user returns to the office.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating user interaction with a software application, the method comprising:
   displaying a first primary window of an application;
   selecting a secondary window within the first primary window, in response to user interaction with a graphical user interface menu;
   generating a detached window based on the secondary window, wherein the detached window is outside of the first primary window;
   leaving a ghost header in the first primary window in place of the secondary window in response to generation of the detached window, wherein the ghost header does not include content of the secondary window, wherein the ghost header includes a first user interface control that implements a first action pertaining to the detached window, in response to user interaction with the first user interface control, wherein the detached window includes user interface controls that correspond with user interface controls in the ghost header including attachment-detachment buttons and menu buttons, and wherein the ghost header provides additional user interface controls for performing actions on the detached window including synchronizing behavior, configuring behavior of windows, and configuring behavior of grouped windows;

including a second user interface control in proximity to the detached window, wherein the second user interface control implements a second action in response to user interaction with the second user interface control;

synchronizing content in the first primary window with content in the detached window wherein the content includes data and functionality; and selecting the ghost header in response to user selection of the detached window.

2. The method of claim 1, wherein the secondary window includes a secondary window header, wherein the secondary window header includes at least one interface control that functions as a first detach button, wherein interaction with the first detach button causes the secondary window to be detached from the first primary window, wherein the secondary window being detached from the first primary window includes the generating of the detached window, wherein the detached window is based on the secondary window, wherein the detached window is generated outside of the first primary window, wherein the secondary window header includes at least one interface control that functions as a first attach button, wherein interaction with the first attach button causes the secondary window to be reattached to the first primary window if having been detached from the first primary window, wherein the secondary window header includes at least one interface control that functions as a first menu button, wherein interaction with the first menu button causes a display of a first drop-down menu that includes additional user interface controls for initiating actions pertaining to the secondary window and any corresponding detached window, wherein the leaving of the first user interface control in the first primary window includes leaving a ghost header that includes the first user interface control, wherein the ghost header is left in place of the secondary window in response to the generation of the detached window, wherein the ghost header corresponds to the detached window, wherein the first interface control of the ghost header includes a plurality of controls, wherein the plurality of controls includes a second attach button and a second menu button, wherein the second attach button and second menu button of the ghost header corresponds to the first attach button and the first menu button of the secondary window header, wherein the second attach button causes the secondary window to be reattached to the first primary window if having been detached from the first primary window, wherein interaction with the second menu button causes a display of a third drop-down menu that includes additional user interface controls for initiating actions pertaining to the secondary window and any corresponding detached window, wherein the detached window includes a detached window header, wherein the detached window header includes a second user interface control, wherein the second user interface control of the detached window header includes a plurality of controls, wherein the plurality of controls includes a third attach button and a third menu button, wherein the third attach button and a third menu button of the ghost header corresponds to the first attach button and the first menu button of the secondary window header, wherein interaction with the third attach button causes the secondary window to be reattached to the first primary window if having been detached from the first primary window, wherein interaction with the third menu button causes a display of a third drop-down menu that includes additional user interface controls for initiating actions pertaining to the secondary window and any corresponding detached window, wherein the first user interface controls of the ghost header and the second user interface controls of the detached window header control the detached window, such that the detached window can be controlled from two locations, wherein a second drop-down menu includes a user interface control for bringing the detached window forward in front of other windows, wherein the second drop-down menu includes a user interface control for sending a detached window behind other windows, wherein the third drop-down menu includes a user interface control for bringing the detached window forward in front of other windows, wherein the third drop-down menu includes a user interface control for sending a detached window behind other windows, wherein the second drop-down menu includes a user interface control for resetting a window layout of the application, wherein the resetting of the window layout causes the detached window to return to a parent primary window, wherein the third drop-down menu includes a user interface control for resetting a window layout of the application, wherein the resetting of the window layout causes the detached window to return to the parent primary window, wherein the second drop-down menu includes a user interface control for generating an additional window, wherein the third drop-down menu includes a user interface control for generating an additional window, wherein the second drop-down menu includes a user interface control for providing a dialog box with user interface controls for adjusting parameters of windows, wherein the third drop-down menu includes a user interface control for providing a dialog box with user interface controls for adjusting parameters of windows, wherein the second drop-down menu includes a user interface control for providing a dialog box with user interface controls for adjusting behaviors of windows, and wherein the third drop-down menu includes a user interface control for providing a dialog box with user interface controls for adjusting behaviors of windows.

3. The method of claim 2, wherein the second user interface control is implemented as part of a header of the detached window, and wherein the second action includes creating a new window group.

4. The method of claim 2, wherein the second user interface control is implemented as part of a header of the detached window, and wherein the second action includes adding the detached window to a window group.

5. The method of claim 4, further comprising synchronizing content between windows of the window group, wherein the content includes one or more of data, one or more tables, one or more graphs, and one or more user interface features.

6. The method of claim 1, wherein the first user interface control is implemented as part of a ghost header remaining in the first primary window in response to detachment of a section as a detached window, and wherein the first action includes displaying a group status of the detached window, wherein the group status indicates whether or not the detached window is part of a window group.

7. The method of claim 1, further comprising:
in response to a user selection, detaching plural sections of the first primary window, resulting in plural detached windows;
assigning one or more windows of the plural detached windows to a window group via the second user interface control provided in a header of one or more of the plural detached windows, wherein the second user interface control includes a drop-down menu including one or more controls to select a window group and to create a window group;
selecting, in response to a user input, one or more open windows of the plural detached windows;
automatically adding selected open windows to a window group identified in the drop-down menu in response thereto;
selecting, in response to a user input, one or more open windows of the plural detached windows, and automatically deploying one or more drop-down menus in each selected window in response thereto, wherein a deployed drop-down menus include one or more user options for specifying a window group to assign to the selected one or more open windows;
in response to a user input, adding one or more windows detached from a second primary window to a window group that includes one or more windows detached of the first primary window;
moving all windows of a window group forward in front of one or more other windows that are not part of the window group, upon user selection of a window of the window group; and
in response to a user input, sticking a detached window, resulting in a stuck window in response thereto, so that user selection of a window of an application associated with the stuck window causes the stuck window to come forward in front one or more other windows of the application.

8. The method of claim 1, further comprising:
performing the following in response to one or more user inputs: group multiple detached windows; synchronize the multiple detached windows; selectively stick multiple detached windows, resulting in one or more stuck detached windows; and selectively bring forward all stuck detached windows upon user selection of one or more of the multiple detached windows.

9. The method of claim 1, further including providing a third user interface control in a window header to implement an action applicable to all windows of a window group associated with the window header.

10. The method of claim 9, further comprising:
providing a fourth user interface control in a window header, wherein the fourth user interface control displays a drop-down menu with user options for creating a new window group;
selecting a window group; and
adding the detached window to the selected window group.

11. The method as recited by claim 1, wherein the detached window is a first detached window and wherein the method further comprises:
detecting formation of a bounding box around a portion of the first primary window using a mouse;
selecting a section of the first primary window based on the bounding box around the portion of the first primary window; and
creating a second detached window by detaching the section within the bounding box.

12. The method as recited by claim 1, wherein the data comprises a group consisting of a table and a graph.

13. The method as recited by claim 1, wherein the functionality includes one or more of automatically grouping open windows based on content that is entered into open windows, and bringing windows forward and sending windows backward.

14. The method as recited by claim 1, wherein the method further comprises:
sticking a subset of windows of a window group together, wherein the windows in the subset of windows have an overlapped order with respect to each other; and
bringing the subset of the windows forward other windows in the window group in response to user selection of a window of the window group, wherein the overlapped order of the subset of windows is preserved when the subset of windows is brought forward.

15. The method as recited by claim 14, wherein all windows of the subset of windows belongs to the application.

16. The method as recited by claim 14, wherein at least one window in the subset of windows belongs to a different application than other windows of the subset of windows.

17. The method as recited by claim 1, wherein the method further comprises:
selecting a window that is not part of a group causes all windows of the group to come forward while preserving an overlap order of the windows in the group.

18. The method as recited by claim 1, wherein the method further comprises:
in response to selecting one window of an unstuck group of windows, bringing all of the unstuck group of windows forward; and
in response to selecting any window in the application, bringing an entire group of stuck windows forward, wherein the any window does not belong to the group of stuck windows.

19. An apparatus comprising:
a digital processor coupled to a display and to a processor-readable storage device, wherein the processor-readable storage device includes one or more instructions executable by the digital processor to perform operations comprising:

displaying a first primary window of an application;

selecting a secondary window within the first primary window, in response to user interaction with a graphical user interface menu;

generating a detached window based on the secondary window, wherein the detached window is outside of the first primary window;

leaving a ghost header in the first primary window in place of the secondary window in response to generation of the detached window, wherein the ghost header does not include content of the secondary window, wherein the ghost header includes a first user interface control that implements a first action pertaining to the detached window, in response to user interaction with the first user interface control, wherein the detached window includes user interface controls that correspond with user interface controls in the ghost header including attachment-detachment buttons and menu buttons, and wherein the ghost header provides additional user interface controls for performing actions on the detached window including synchronizing behavior, configuring behavior of windows, and configuring behavior of grouped windows;

including a second user interface control in proximity to the detached window, wherein the second user interface control implements a second action in response to user interaction with the second user interface control;

synchronizing content in the first primary window with content in the detached window wherein the content includes data and functionality; and selecting the ghost header in response to user selection of the detached window.

20. A non-transitory processor-readable storage device including instructions executable by a digital processor, that when executed cause the digital processor to perform operations comprising:

displaying a first primary window of an application;

selecting a secondary window within the first primary window, in response to user interaction with a graphical user interface menu;

generating a detached window based on the secondary window, wherein the detached window is outside of the first primary window;

leaving a ghost header in the first primary window in place of the secondary window in response to generation of the detached window, wherein the ghost header does not include content of the secondary window, wherein the ghost header includes a first user interface control that implements a first action pertaining to the detached window, in response to user interaction with the first user interface control, wherein the detached window includes user interface controls that correspond with user interface controls in the ghost header including attachment-detachment buttons and menu buttons, and wherein the ghost header provides additional user interface controls for performing actions on the detached window including synchronizing behavior, configuring behavior of windows, and configuring behavior of grouped windows;

including a second user interface control in proximity to the detached window, wherein the second user interface control implements a second action in response to user interaction with the second user interface control;

synchronizing content in the first primary window with content in the detached window wherein the content includes data and functionality; and selecting the ghost header in response to user selection of the detached window.

\* \* \* \* \*

UNITED STATES PATENT AND TRADEMARK OFFICE
CERTIFICATE OF CORRECTION

PATENT NO. : 10,761,673 B2  
APPLICATION NO. : 13/795678  
DATED : September 1, 2020  
INVENTOR(S) : Musa et al.

Page 1 of 1

It is certified that error appears in the above-identified patent and that said Letters Patent is hereby corrected as shown below:

In the Specification

In Column 8, Line 30, delete "server side" and insert -- server-side --, therefor.

In Column 18, Line 51, after "of" delete "a".

In Column 21, Line 8, delete "MicroSoft" and insert -- Microsoft --, therefor.

In the Claims

In Column 23, Line 21, in Claim 1, delete "window" and insert -- window, --, therefor.

In Column 27, Line 33, in Claim 19, delete "window" and insert -- window, --, therefor.

In Column 28, Line 32, in Claim 20, delete "window" and insert -- window, --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*